US010634487B2

United States Patent
Zhao et al.

(10) Patent No.: US 10,634,487 B2
(45) Date of Patent: Apr. 28, 2020

(54) METHOD AND SYSTEM FOR OPTICAL THREE DIMENSIONAL TOPOGRAPHY MEASUREMENT

(71) Applicant: KLA-Tencor Corporation, Milpitas, CA (US)

(72) Inventors: Guoheng Zhao, Palo Alto, CA (US); Maarten van der Burgt, Leuven (BE); Sheng Liu, Fremont, CA (US); Andy Hill, Portland, OR (US); Johan De Greeve, Brabant (BE); Karel van Gils, Blanden (BE)

(73) Assignee: KLA-Tencor Corporation, Milpitas, CA (US)

( * ) Notice: Subject to any disclaimer, the term of this patent is extended or adjusted under 35 U.S.C. 154(b) by 116 days.

(21) Appl. No.: 15/329,778

(22) PCT Filed: Nov. 4, 2016

(86) PCT No.: PCT/US2016/060599
§ 371 (c)(1),
(2) Date: Jan. 27, 2017

(87) PCT Pub. No.: WO2017/136011
PCT Pub. Date: Aug. 10, 2017

(65) Prior Publication Data
US 2018/0209784 A1    Jul. 26, 2018

Related U.S. Application Data

(60) Provisional application No. 62/289,889, filed on Feb. 1, 2016.

(51) Int. Cl.
*G01B 11/24* (2006.01)
*G01B 11/25* (2006.01)
*G01B 11/06* (2006.01)

(52) U.S. Cl.
CPC ...... *G01B 11/2518* (2013.01); *G01B 11/0608* (2013.01); *G01B 11/24* (2013.01);
(Continued)

(58) Field of Classification Search
CPC . G01B 11/0608; G01B 11/24; G01B 11/2513; G01B 11/2518; G01B 2210/56
(Continued)

(56) References Cited

U.S. PATENT DOCUMENTS 5,471,303 A   11/1995 Ai et al.
6,268,923 B1   7/2001 Michniewicz et al.
(Continued)

FOREIGN PATENT DOCUMENTS

EP    2437027 A2    4/2012

OTHER PUBLICATIONS

Colonna de Lega, et al., Optical Topography Measurement of Patterned Wafers, Characterization and Metrology for ULSI Technology, vol. 788, pp. 432-436 Jan. 1, 2005.
(Continued)

*Primary Examiner* — Sunghee Y Gray
(74) *Attorney, Agent, or Firm* — Hodgson Russ LLP

(57) ABSTRACT

For three-dimensional topography measurement of a surface of an object patterned illumination is projected on the surface through an objective. A relative movement between the object and the objective is carried out, and plural images of the surface are recorded through the objective by a detector. The direction of the relative movement includes an oblique angle with an optical axis of the objective. Height information for a given position on the surface is derived from a variation of the intensity recorded from the respective position. Also, patterned illumination and uniform illumination may be projected alternatingly on the surface, while images of the surface are recorded during a relative move- (Continued)

ment of the object and the objective along an optical axis of the objective. Uniform illumination is used for obtaining height information for specular structures on the surface, patterned illumination is used for obtaining height information on other parts of the surface.

10 Claims, 15 Drawing Sheets

(52) U.S. Cl.
CPC ...... *G01B 11/2513* (2013.01); *G01B 11/2522* (2013.01); *G01B 2210/56* (2013.01)

(58) Field of Classification Search
USPC .................................................. 356/600–612
See application file for complete search history.

(56) References Cited

U.S. PATENT DOCUMENTS

| | | | |
|---|---|---|---|
| 6,549,288 | B1 | 4/2003 | Migdal et al. |
| 6,870,609 | B2 | 3/2005 | Watkins et al. |
| 6,893,800 | B2 | 5/2005 | Jessen et al. |
| 7,126,699 | B1 | 10/2006 | Wihl et al. |
| 8,649,024 | B2 | 2/2014 | Colonna de Lega |
| 2002/0039187 | A1* | 4/2002 | Keranen ............ G01B 11/2522 356/604 |
| 2002/0145734 | A1 | 10/2002 | Watkins et al. |
| 2004/0246496 | A1* | 12/2004 | Yoshida ............ G01B 11/2527 356/605 |
| 2011/0001818 | A1 | 1/2011 | Hur et al. |
| 2011/0122420 | A1 | 5/2011 | Jansen et al. |
| 2012/0140243 | A1 | 6/2012 | Colonna De Lega |
| 2012/0307259 | A1 | 12/2012 | Leung et al. |
| 2013/0155415 | A1* | 6/2013 | Nishikawa ......... G01B 11/0608 356/503 |
| 2014/0093986 | A1 | 4/2014 | Popescu et al. |
| 2014/0376064 | A1* | 12/2014 | Rosberg ............. G01B 11/2513 358/475 |
| 2015/0054922 | A1* | 2/2015 | Fisker .................. A61B 5/0068 348/46 |
| 2017/0034425 | A1* | 2/2017 | Hamano ............ H04N 5/23212 |
| 2017/0272643 | A1* | 9/2017 | Tamaki .............. H04N 9/04517 |
| 2018/0058902 | A1* | 3/2018 | Murooka .............. A61M 37/00 |

OTHER PUBLICATIONS

Chen, et al., Overview of three-dimensional shape measurement using optical methods, Optical Engineering, vol. 39, No. 1, pp. 10-22 Jan. 1, 2000.

Vogel, et al., Structured-illumination microscopy on technical surfaces: 3D metrology with nanometer sensitivity, PRoc. of SPIE 8082, Optical Measurement Systems for Industrial Inspection VII, 6 pages May 26, 2011.

Gustafsson, et al., Education in Microscopy and Digital Imaging, ZEISS Microscopy Online Campus, Superresolution Structured Illumination Microscopy, available at http://zeisscampus.magnet.fsu.edu/articles/superresolution/supersim.html Feb. 1, 2016.

Yang, et al., "Structured-Illumination-MAcroscopy" (SIMA) for high speed electronic inspection, DGaO Proceedings 2014, 2 pages Aug. 27, 2014.

ISA/KR, International Search Report for PCT/US2016/060599 dated Apr. 13, 2017.

Ishihara et al., "Three-dimensional surface measurement using grating projection method by detecting phase and contrast," Optical Engineering for Sensing and Nanotechnology (ICOSN'99), vol. 3740, International Society for Optics and Photonics, 1999.

Korner et al., "One-grating projection for absolute three-dimensional profiling," Optical Engineering 40(8), 2001, 1653-1660.

EPO, Search Report for EP16889639, dated Aug. 26, 2019.

\* cited by examiner

A

B

C

D

METHOD AND SYSTEM FOR OPTICAL THREE DIMENSIONAL TOPOGRAPHY MEASUREMENT

CROSS REFERENCE TO RELATED APPLICATIONS

This application claims priority of U.S. provisional application U.S. 62/289,889, filed on Feb. 1, 2016, which is included herein by reference in its entirety.

FIELD OF THE INVENTION

The invention relates to a method and a system for three-dimensional (3D) topography measurement of a surface of an object, wherein patterned illumination is projected onto in the surface of the object through an objective and height information on the surface is obtained from images of the surface recorded during a relative movement between the object and the objective.

BACKGROUND OF THE INVENTION

Information on the topography of a surface of an object is required in various areas of manufacturing. An area where the need for such information is particularly prominent is semiconductor manufacturing, where the semiconductor devices need to be inspected to ensure proper function. Such inspection includes specific structures making up the devices on a wafer, but also entities like solder bumps, which are required for holding components of a device together. For example, a die cut from a wafer may first be contacted to pins of a chip with an array of solder bumps. The chip can then be contacted to external circuitry by solder balls. For quality assurance, the heights of the solder bumps and solder balls with respect to the substrate have to be inspected before completion of the soldering.

Several methods for 3D topography measurements are well known in the art. Among these methods are white light interferometry, confocal microscopy, methods based on structured illumination, and laser triangulation with stereo vision. All these methods have their specific advantages and disadvantages.

White light interferometry is capable of providing height information of very high precision. The surface is moved in the interferometer by steps smaller than one wavelength; therefore, when inspecting semiconductor devices, a large number of frames of the surface needs to be taken and processed, as the steps have to extend over a range comparable with the height variation occurring on the surface.

Both confocal microscopy and methods based on structured illumination require rather standard microscope optics. Both approaches are better suited for inspecting surface topography at the scale of typical semiconductor devices. While confocal microscopy generally provides better height resolution than methods based on structured illumination, it also requires a more complicated and expensive optical setup.

The basic concept of methods based on structured illumination is to project a pattern, for example a grating, onto the surface of the object. There are two general approaches.

For an imaging system with low numerical aperture (NA), for example below 0.1, for which a longer working distance and a greater depth of focus are possible, the pattern can be projected onto the surface at an angle with respect to the imaging optical axis. Such an arrangement is similar to laser triangulation, as the fringe phase shift instead of the position shift of a line illumination is used to extract surface height. This approach is also known as phase shift fringe projection method.

In case of an imaging system with higher NA, above 0.1, neither oblique projection nor oblique imaging is easily implemented, as both depth of focus and working distance are limited. Here, instead, the pattern, for example a grating, is projected onto the surface through the imaging optics, and the optical axis of the imaging optics is normal to the surface of the object, more precisely to the plane defined by the general macroscopic extension of the surface. Due to this arrangement, height information cannot be extracted from fringe phase shift instead, height information can be obtained by moving the object in a direction parallel to the optical axis, and finding the position shift along this direction at which the contrast of the projected pattern is maximum.

There is a similarity between this setup and a confocal microscope, but the optics is simpler, not requiring relay optics. However, a higher data rate is required, as extracting the contrast of the pattern image requires three or more frames for each height position.

One example of such an approach, of structured illumination normal to the surface, can be found in U.S. Pat. No. 8,649,024 B2, issued on application Ser. No. 13/309,244. A pattern is generated by a spatial light modulator (SLM) and projected onto the surface of an object along an optical axis of an imaging objective. The object is moved relative to the objective along the optical axis, while the SLM modulates the projected pattern and a plurality of images are recorded. Maximum contrast of the projected pattern at a particular position on the surface yields height information for the respective position.

Which of the methods for 3D topography measurement mentioned above is best depends on the requirements of the specific measurement application. For semiconductor device inspection, some key requirements are: a resolution in the plane defined by the macroscopic extension of the surface of a few μm, a repeatability of positioning the object along a direction normal to this plane of less than 1 μm, a total range of movement along this normal direction of a few hundred μm. In view of this, methods based on structured illumination appear to be the most suitable for semiconductor device inspection by 3D topography measurements. The configurations of pertinent systems can cover a wide range both of resolution in the plane of the surface and of repeatability normal to the plane, and the methods achieve a large range of relative movement along the normal direction. The optics is comparatively simple and low cost, the setup of illumination and imaging along the normal direction is suitable for a wide variety of surface types, including both surfaces with predominantly specular reflection and surfaces with predominantly diffuse reflection. In particular with respect to the inspection of solder bumps, a larger NA yields a larger number of usable pixels at the spherical bump top of smaller bumps.

While the basic concept of structured illumination outlined above and exemplified in the cited U.S. Pat. No. 8,649,024 B2 achieves the required precision and accuracy, an unresolved problem is how to achieve these required characteristics while at the same time meeting ever increasing throughput requirements at preferably low cost, moreover in a manner that is scalable. For example, the spatial light modulator of the cited patent U.S. Pat. No. 8,649,024 B2 used for generating the patterned illumination is expensive, yet does not have the resolution and pixel counts for covering a large field of view, which, however, would be essential for higher throughput.

SUMMARY OF THE INVENTION

It is an object of the invention to provide a method for three-dimensional topography measurement of a surface of an object, which is easily implemented, provides sufficient in-plane resolution and repeatability along the normal direction, and is scalable.

It is a further object of the invention to provide a system for three-dimensional topography measurement of a surface of an object, which is of simple configuration, provides sufficient in-plane resolution and repeatability along the normal direction, and is modular and compact so as to be scalable.

In the method according to the invention for optical three-dimensional topography measurement of a surface of an object, patterned illumination is projected through an objective onto the surface of the object. A relative movement is performed between the object and the objective. A direction of this relative movement includes an oblique angle with an optical axis of the objective. The surface of the object passes through a focal plane of the objective during the relative movement; the optical axis of the objective is perpendicular to the focal plane. During the relative movement a plurality of images of the surface are recorded through the objective. The pattern of the patterned illumination is at best focus in the focal plane of the objective; in planes parallel to the focal plane, but offset from the focal plane along the optical axis, the pattern is out of focus. In an image of the surface, those parts of the surface which are in the focal plane appear at best focus in the image; parts of the surface not in the focal plane appear out of focus. A pattern on the surface at best focus, also imaged at best focus, has a high contrast, while a pattern on the surface out of focus, also imaged out of focus, has a reduced contrast in an image recorded of the surface. This dependence of the contrast on the position of parts of the surface along the optical axis leads to a variation of the intensity recorded from these parts of the surface of the object during the relative movement. Height information for a respective position on the surface of the object is derived from the variation of the intensity recorded from the respective position in the plurality of images.

The height of a position on the surface refers to the distance of the position from a reference plane along a direction normal to the reference plane. Typically, the reference plane is defined by the macroscopic extension of the surface; for example, a manufactured wafer bears a plurality of microscopic structures on its surface, nonetheless, macroscopically, this surface appears as a plane surface and thus defines a plane. While performing the method, the reference plane, if the object is correctly aligned, is parallel to the focal plane of the objective. The heights for all positions on the surface give the topography of the surface. Due to the oblique angle between the direction of relative movement and the optical axis of the objective, the position of the pattern of the patterned illumination relative to the surface of the object changes during the relative movement. This obviates the need for separately modulating the pattern, as is necessary in prior art methods of structured or patterned illumination, and thus renders the method easier to implement. The relative movement between the object and the objective, over the course of the relative movement, causes a modulation of the light intensity impinging on any specific position on the surface to be measured. This modulation is, on the one hand, due to the relative movement between the pattern of the projected illumination and the surface, just discussed above, but, importantly, contains an additional contribution due to the change of contrast of the pattern at the specific position as the object is moved relative to the objective. In turn, this leads to a modulation of the light intensity recorded from the respective position in the plurality of images. Height for each respective position is derived from this modulation of recorded light intensity. The respective position of the object along the optical axis, for example expressed as the position on the optical axis where the reference plane intersects the optical axis, at which each of the plurality of images has been respectively recorded, is information used in the analysis to derive the height information.

In an advantageous embodiment, particularly suitable for computer driven performance of the method and data analysis by a computer, each of the plurality of images is recorded as a digital image, in other words as an array of pixels. Each of the images, by digital image processing, is shifted such that a given position on the surface of the object corresponds to one and the same pixel in the array of pixels for all images of the plurality of images. This shift compensates the displacement between the objective and the object in a plane perpendicular to the optical axis of the objective, which displacement is due to the oblique angle of the relative movement between the object and the objective. In this way the modulation of the light intensity recorded from a specific position on the surface of the object is monitored by the values a specific pixel of the array, representing the position on the surface in all the recorded images after the shift, assumes in the various images of the plurality of images. Depending on the number of pixels in the array, i.e. in the digital image, and on resolution requirements, the values of more than one pixel may be combined, e.g. by summing or averaging, and the result may be considered to correspond to the intensity of light recorded from the respective position on the surface of the object for the further course of the method. Averaging over plural pixels reduces noise. For example, the values of an N×N array of pixels may be averaged, with, for instance, N=2, 3, 4, or 5.

In embodiments, the patterned illumination is generated by incoherent illumination of a pattern mask. The pattern mask may in particular be a grating. More specifically, the grating may be an amplitude grating or a phase grating, Non-limiting examples of grating geometry which may be used are a line grating, a sinusoidal grating, or a cross-line grating. The grating may also be a blazed grating. More generally, the pattern mask may have a checkerboard pattern or a pinhole array, without being limited to these options. Any pattern known in the art for generating structured illumination is suitable also for the method according to the invention. The grating preferably is mechanical, for example an etched sheet of metal or a metal coated glass substrate, like for instance chrome (Cr) on glass.

In principle, also a spatial light modulator may be considered for generating the patterned illumination. A pattern mask or grating, however, is preferred for several reasons: Gratings are available at considerably higher resolutions than spatial light modulators and are not limited by pixel counts; this is advantageous both in terms of resolution in the plane perpendicular to the optical axis and in terms of field of view. The available, as well as the envisaged, pixel count for spatial light modulators is far behind the pixel counts of cameras, for example CMOS based cameras, which may be used to record digital images of the surface of the object according to the inventive method. This means here a spatial light modulator would be the dominating limitation, and thus should be avoided. Furthermore, spatial light modulators capable of producing a modulation of a certain minimum wavelength (limited by pixel count) are far more expensive than gratings with an orders of magnitude lower distance between neighboring lines of the gratings.

For improving contrast of the projected patterned illumination on the surface of the object, the patterned illumination may advantageously be generated such that it only contains a $0^{th}$ diffraction order and one diffracted order, for example one $1^{st}$ diffraction order, at equal intensities. This may for example be achieved by using a blazed grating.

The steps of the inventive method, described above in general and with respect to specific embodiments, may advantageously be performed in parallel on a plurality of objects. In this way throughput can be increased; as the method is easier to implement than methods of prior art, this increase in throughput can also be achieved easily, and at comparatively low cost.

In a further general embodiment of the method according to the invention for optical three-dimensional topography measurement of a surface of an object, patterned illumination and uniform illumination are projected alternatingly through an objective onto the surface of the object. Thus there are time intervals during which the surface of the object is illuminated with patterned illumination, and time intervals during which the surface of the object is illuminated with uniform illumination.

A relative movement is performed between the object and the objective. A direction of the relative movement includes a component along an optical axis of the objective; the surface passes through a focal plane of the objective during the relative movement. The optical axis is perpendicular to the focal plane. During the relative movement a plurality of images of the surface are recorded through the objective. Height information for a respective position on the surface of the object is derived from the variation of the intensity recorded from the respective position in the plurality of images.

The height of a position on the surface refers to the distance of the position from a reference plane along a direction normal to the reference plane. Typically, the reference plane is defined by the macroscopic extension of the surface; for example, a manufactured wafer bears a plurality of microscopic structures on its surface, nonetheless, macroscopically, this surface appears as a plane surface and thus defines a plane. While performing the method, the reference plane, if the object is correctly aligned, is parallel to the focal plane of the objective. The heights for all positions on the surface give the topography of the surface. The respective position of the object along the optical axis, for example expressed as the position on the optical axis where the reference plane intersects the optical axis, at which each of the plurality of images has been respectively recorded, is information used in the analysis to derive the height information.

Of the plurality of images recorded during the relative movement between the object and the objective, some images are recorded under the uniform illumination and some images are recorded under the patterned illumination. In an embodiment, images of the plurality of images recorded under the uniform illumination are used for deriving height information for a specular structure on the surface, and images of the plurality of images recorded under the patterned illumination are used for deriving height information for portions of the surface between specular structures. For example, specular structures may be solder bumps on the surface. Height information on the solder bumps is then derived from the images recorded under uniform illumination, and height information on the surface between the solder bumps is derived from the images recorded under patterned illumination. In a specific embodiment, height information for specular structures, like for example solder bumps, is derived from the size of an image of a top portion of the specular structure. This size varies between the images recorded under uniform illumination, which variation also constitutes an intensity variation for the pixels in the image representing the top portion in the various images. The position of the top portion of the specular structure along the optical axis of the objective can be derived from this size variation and thus indirectly height information for the specular structure can be obtained. At best focus, i.e. when the top portion of the specular structure is in the focal plane, the size of the image of the top portion is smallest. As an alternative, height information for a specular structure may be obtained from peak pixel intensity over the course of the relative movement. The intensity recorded from the top of the specular structure, and thus also the value of the pixel corresponding to the top of the specular structure, is highest if the top of the specular structure is in the focal plane of the objective.

In specific embodiments, the direction of the relative movement is parallel to the optical axis of the objective. In these embodiments, in the case of digital images, there is in particular no need for a shift, as mentioned above, of the recorded images, as there is no displacement of the object perpendicular to the optical axis of the objective. A given pixel in the pixel array of the recorded digital images will correspond to the same position on the surface of the object without such a shift.

Contrast of the pattern of the patterned illumination in images recorded of the surface of the object under patterned illumination varies over the course of the relative movement, as it depends on the position any imaged part of the surface, or imaged position on the surface, has along the optical axis of the objective. Contrast is best, if such part of the surface or position on the surface is in the focal plane of the objective. Therefore, height information on the part of the surface or position on the surface can be derived from the contrast of the pattern in the plurality of images.

In embodiments with alternating illumination, too, the patterned illumination may be generated by incoherent illumination of a pattern mask. The pattern mask may in particular be a grating. More specifically, the grating may be an amplitude grating or a phase grating. Non-limiting examples of grating geometry which may be used are a line grating, a sinusoidal grating, or a cross-line grating. The grating may also be a blazed grating. More generally, the pattern mask may have a checkerboard pattern or a pinhole array, without being limited to these options. Any pattern known in the art for generating structured illumination is suitable also for the method according to the invention. The grating preferably is mechanical, for example an etched sheet of metal or a metal coated glass substrate, like for instance chrome (Cr) on glass.

Also, and in analogy to the embodiments with a patterned illumination only, for improving contrast of the projected patterned illumination on the surface of the object, the patterned illumination may advantageously be generated such that it only contains a $0^{th}$ diffraction order and one diffracted order, for example one $1^{st}$ diffraction order, at equal intensities. This may for example be achieved by using a blazed grating.

As for embodiments with patterned illumination only, the steps of the method may advantageously be performed in parallel on a plurality of objects. In this way throughput can be increased; as the method is easier to implement than methods of prior art, this increase in throughput can also be achieved easily, and at comparatively low cost.

A system according to the invention for optical three-dimensional topography measurement of a surface of an object comprises a source of patterned illumination, an objective, a detector, and means for performing a relative movement between the objective and the object.

The objective is arranged to direct the patterned illumination to the surface of the object, and is also arranged to image the surface of the object onto the detector, which in turn is arranged and configured for recording a plurality of images of the surface of the object. The detector may for example be part of a camera, configured to record digital images. The detector may for example be based on CMOS or CCD technology. The means for performing a relative movement between the objective and the object are configured such that a direction of the relative movement includes an oblique angle with an optical axis of the objective. It is therefore sufficient to implement means which are capable of performing a one-dimensional translational relative movement between the objective and the object. There is no need, as there is in prior art, to move for example the object along an optical axis of an objective used for imaging the surface of the object, and in addition for example to modulate the patterned illumination, either by using a spatial light modulator or by additionally moving a grating.

In embodiments, the source of patterned illumination includes a light source and a pattern mask. The light source may in particular be an incoherent light source, for example one or plural light emitting diodes (LEDs).

In embodiments, the pattern mask, without being limited thereto, has a checkerboard pattern or a pinhole array. Other patterns, known in the art for generating patterned illumination, may be used as well.

In particular, the pattern mask may be a grating, more specifically an amplitude grating or a phase grating. The grating may for example be a line grating or a sinusoidal grating or a cross-line grating. The grating may also be a blazed grating. The grating preferably is mechanical, for example an etched sheet of metal or a metal coated glass substrate, like for instance chrome (Cr) on glass.

In an advantageous embodiment, a beam splitter is arranged in such a way that both an illumination path between the source of patterned illumination and the objective, and an imaging path between the objective and the detector pass through the beam splitter. In particular, the objective may be corrected to diffraction limited performance, the correction also taking into account the beam splitter. In this way, an optical setup of high quality is achieved, while at the same time this setup is of rather compact and simple configuration. As a result, the setup can be realized as a low-cost module, and plural modules may be combined into a device for performing 3D topography measurements on a plurality of objects in parallel.

A further reduction of imaging errors, and thus ultimately an increase in measurement precision, is obtained by placing the pattern mask and the detector in conjugate planes.

In a further general embodiment of the system for optical three-dimensional topography measurement of a surface of an object, the system comprises both a source of patterned illumination and a source of uniform illumination, an objective, a detector, and means for performing a relative movement between the objective and the object.

The objective is arranged to direct both the patterned illumination and the uniform illumination to the surface of the object, and to image the surface of the object onto the detector, which in turn is arranged and configured for recording a plurality of images of the surface of the object. The detector may for example be part of a camera, configured to record digital images. The detector may for example be based on CMOS or CCD technology. The means for performing a relative movement between the objective and the object are configured such that a direction of the relative movement includes at least a component along an optical axis of the objective. The system may be configured such that the source of patterned illumination and the source of uniform illumination can be activated independently of each other.

In embodiments, the source of patterned illumination includes a light source and a pattern mask. The light source may in particular be an incoherent light source, for example one or plural light emitting diodes (LEDs).

In embodiments, the pattern mask, without being limited thereto, has a checkerboard pattern or a pinhole array. Other patterns, known in the art for generating patterned illumination, may be used as well.

In particular, the pattern mask may be a grating, more specifically an amplitude grating or a phase grating. The grating may for example be a line grating or a sinusoidal grating or a cross-line grating. The grating may also be a blazed grating. The grating preferably is mechanical, for example an etched sheet of metal or a metal coated glass substrate, like for instance chrome (Cr) on glass.

In an advantageous embodiment, a beam splitter is arranged in such a way that an imaging path between the objective and the detector and at least one of an illumination path between the source of patterned illumination and the objective, and an illumination path between the source of uniform illumination and the objective pass through the beam splitter. In particular, both the illumination path between the source of patterned illumination and the objective, and the illumination path between the source of uniform illumination and the objective may pass through the beam splitter. The objective may be corrected to diffraction limited performance, the correction also taking into account the beam splitter. In this way, an optical setup of high quality is achieved, while at the same time this setup is of rather compact and simple configuration. As a result, the setup can be realized as a low-cost module, and plural modules may be combined into a device for performing 3D topography measurements on a plurality of objects in parallel.

A further reduction of imaging errors, and thus ultimately an increase in measurement precision, is obtained by placing the pattern mask and the detector in conjugate planes.

In an embodiment, the direction of the relative movement between the object and the objective is parallel to the optical axis of the objective.

A system according to the invention generally may include or be connected to one or plural computers for controlling the system and/or performing data analysis related to the three-dimensional topography measurement of a surface of an object. The system may in particular be used, and suitably controlled, to perform any embodiment of the method according to the invention. The one or plural computers may be any suitable known data processing apparatus, embedded or non-embedded, single processor, multi-processor, single core, multi-core; plural computers may work in parallel to perform control of the system and/or data analysis, and may be connected with each other and to the system via a local connection or via a data network, like the Internet.

BRIEF DESCRIPTION OF THE DRAWINGS

The nature and mode of operation of the present invention will now be more fully described in the following detailed description of the invention taken with the accompanying schematic drawing figures.

DETAILED DESCRIPTION OF THE INVENTION

Figure 1:
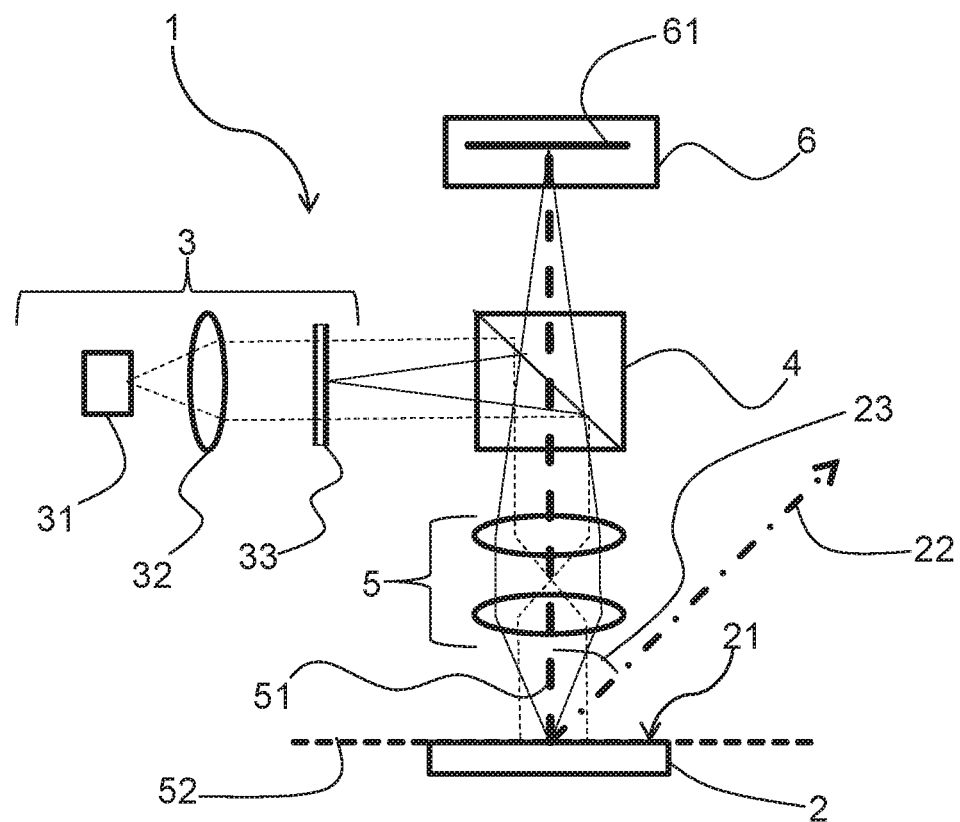
FIG. 1 shows an embodiment of a system for D topography measurements of a surface of an object.

Same reference numerals refer to same elements or elements of similar function throughout the various figures. Furthermore, only reference numerals necessary for the description of the respective figure are shown in the figures. The shown embodiments represent only examples of how the invention can be carried out. This should not be regarded as limiting the invention.

FIG. 1 shows an embodiment of a system 1 for 3D topography measurements of a surface 21 of an object 2. The system 1 has a source of patterned illumination 3; in the embodiment shown, the source of patterned illumination 3 has a light source 31, for example one or plural LEDs, condenser optics 32, and a pattern mask 33. Patterned illumination of the surface 21 of the object 2 is generated by projecting the pattern mask 33 onto the surface 21. More precisely, in the embodiment shown, light from light source 31, after passing condenser 32 and pattern mask 33, reaches beam splitter 4, which directs at least a portion of the light towards objective 5, through which the light reaches surface 21 of object 2. Light from the surface 21 then passes through the objective 5 and reaches beam splitter 4, which directs a portion of the light from the surface 21 to a detector 61, which, as is shown here, may be part of a camera 6. The objective 5 defines an optical axis 51, and a focal plane 52; the optical axis 51 is perpendicular to the focal plane 52. The projected pattern mask 33 is at best focus in the focal plane 52. Via the detector 61 a plurality of images of the surface 21 are recorded, while a relative movement is performed between the object 2 and the objective 5. A direction 22 of the relative movement between the object 2 and the objective 5 includes an oblique angle 23 with the optical axis 51. During the relative movement, the surface 21 of the object 2 passes through the focal plane 52 of the objective 5. In this macroscopic view of the system 1, the focal plane 52 is shown coincident with the surface 21 of the object 2. Parts of the surface 21 which lie in the focal plane appear at best focus in the images recorded of the surface 21 via the detector 61. Due to the oblique angle 23 between the direction 22 of relative movement and the optical axis 51, the pattern of the patterned illumination moves relative to the surface 21 of the object 2; in addition, the contrast of the pattern, as recorded in the images of the surface, changes, as the surface 21 passes through the focal plane 52 over the course of the relative movement along direction 22. As a result, the light intensity recorded from a position on the surface 21 varies between the images of the plurality of images. From this variation of the light intensity, height information for the respective position on the surface 21 can be obtained. For the sake of completeness we mention that the relative movement between the object 2 and the objective 5 may for example be achieved by moving the object 2 or by moving the system 1, or by moving both the object 2 and the system 1.

Figure 2:
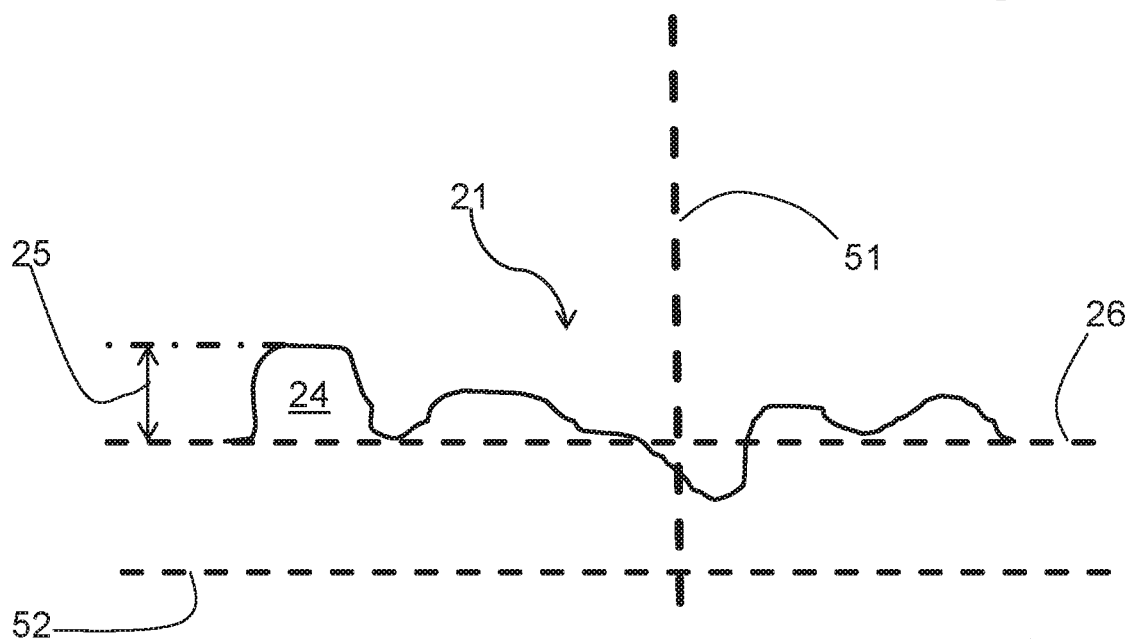
FIG. 2 is a schematic enlarged view of the surface of the object.

FIG. 2 is a schematic enlarged view of a part of the surface 21 of the object 2, showing that the surface 21 generally is not flat, but has structures, like for example the elevation 24. The 3D topography measurements the invention is concerned with aim at obtaining information on a height 25 of these structures, here explicitly shown for elevation 24. The height 25 of the elevation 24 is understood as the extension of the elevation 24 relative to a reference plane 26, along a direction perpendicular to the reference plane 26. Also shown are the optical axis 51 and the pertinent focal plane 52 of the objective 5 (see FIG. 1). If the object 2 is correctly aligned in the system 1, the focal plane 52 is parallel to the reference plane 26, and therefore the optical axis 51 is perpendicular on both the focal plane 52 and the reference plane 26.

Figure 3:
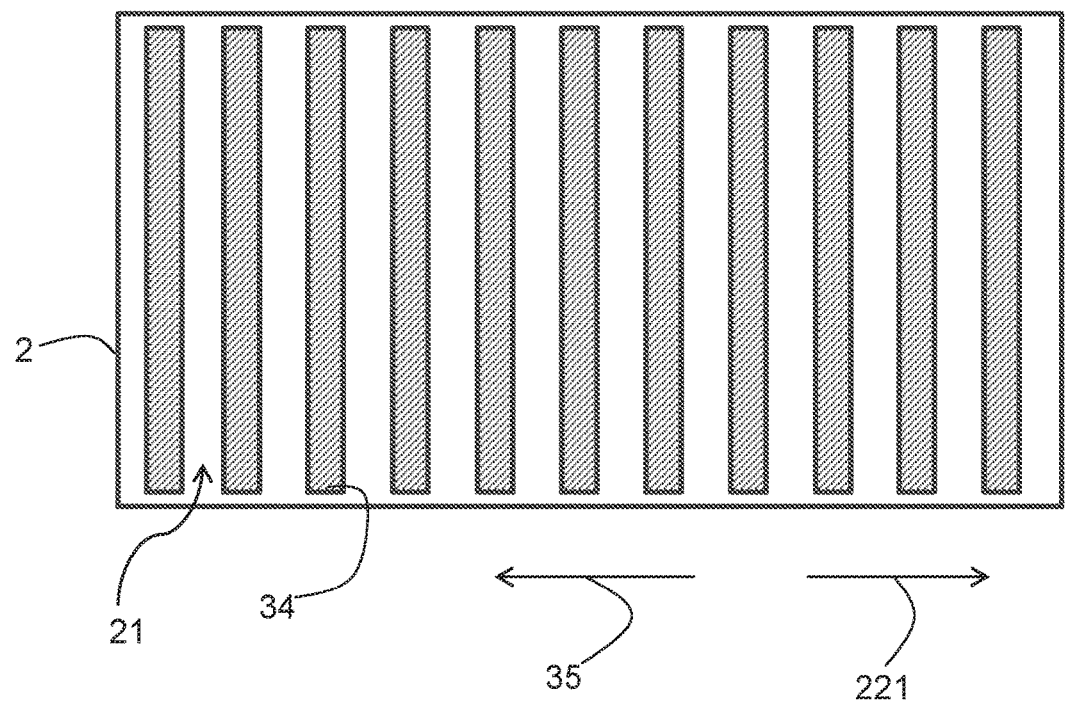
FIG. 3 is a top view of the surface of the object with a projected pattern.

FIG. 3 is a top view of the surface 21 of the object 2, showing a projected pattern 34, originating from the source of patterned illumination 3 (see FIG. 1). In the example shown, and with reference to the preceding figures, the object 2 is moved along direction 22 relative to objective 5, so that this relative movement has a component 221 in the reference plane 26. As a result, the pattern 34 moves in direction 35, opposite to component 221, with respect to the surface 21 of the object 2. This implies that during the relative movement the light intensity incident on a given position on the surface 21 will vary, and as a result, the light intensity recorded from this position will vary between the images recorded of the surface 21 by camera 6.

Figures 4A, 4B:
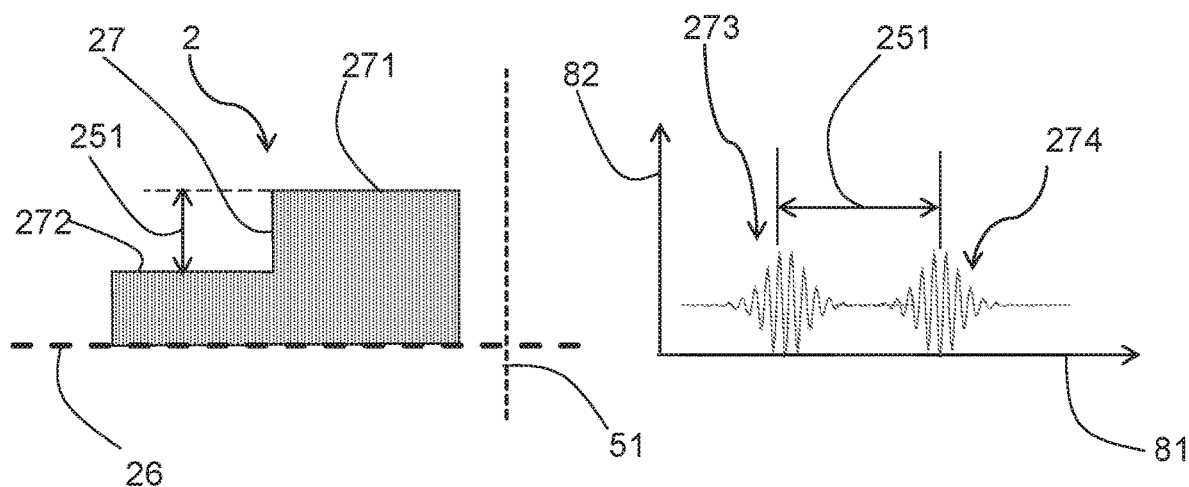
FIG. 4a shows an object of step-like shape.
FIG. 4b shows light intensity signals obtained from an object like in FIG. 4a with the method according to the invention.

FIG. 4a shows an object 2, the reference plane 26, and an optical axis 51 of an objective 5 (see FIG. 1); the optical axis 51 is perpendicular to the reference plane 26. The object 2 has portions 271 and 272, the height values of which, relative to the reference plane 26, differ by an amount 251, so the object 2 has a step 27. In FIG. 4b the corresponding intensity signal, as obtained by the method according to the invention, is shown in a diagram. In the diagram, the abscissa 81 corresponds to a position of the object 2 along the optical axis 51, and the ordinate 82 corresponds to light intensity recorded from a position on the object 2 during relative movement, here more precisely from the position of the step. The light intensity shows two portions of pronounced modulation, 273 and 274. Assuming that in the case shown increasing values along the abscissa 81 correspond to a movement of the object towards the objective, modulation portion 273 results from the passage of portion 271 (greater height, closer to the objective than portion 272) through the focal plane of the objective, and modulation portion 274 results from the passage of portion 272 through the focal plane of the objective. The difference between the positions of the maxima of the modulation portions 273 and 274 on the abscissa 81 corresponds to the height difference 251 between portion 271 and 272 of the object 2. The high frequency modulations in the light intensity, discernible in particular within the modulation portions 273 and 274, result from the combined effect of the pattern and the relative movement between object and objective. For example, if the pattern is a line pattern, these high frequency modulations result as bright and dark lines of the pattern pass over the step 27 of object 2 of FIG. 4a. The amplitude of these high frequency modulations, on the other hand, is determined by the contrast of the line pattern on the surface of the object, here more precisely on the portions 271 and 272, respectively, of object 2. The contrast is highest, and thus the amplitude of the high frequency modulations is highest, if the portion 271 or 272, respectively, is in the focal plane 52 of the objective 5 (see FIGS. 1 and 2).

Figure 5:
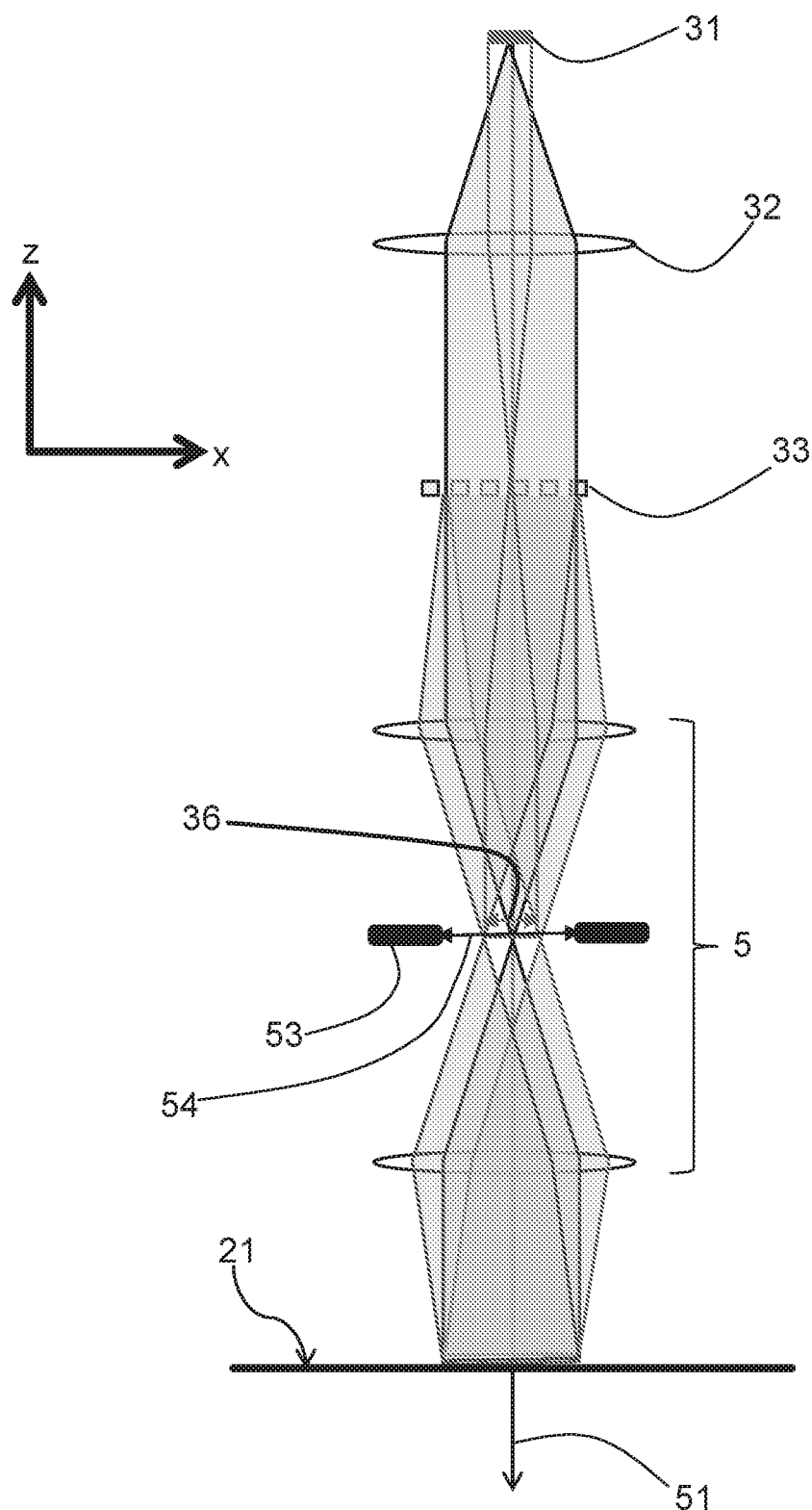
FIG. 5 illustrates an optical configuration as used in the method and system according to the invention.

FIG. 5 shows an optical configuration for an illumination branch as can be used for the method according to the invention. Beam splitter and camera, as in FIG. 1, are not shown. The optical configuration shown in FIG. 5 is used to discuss measurement uncertainty and possible improvements in this field, as precise measurements of height are essential to the invention.

Shown are, as in FIG. 1, light source 31, condenser 32, grating 33, objective 5 with optical axis 51, and surface 21 of object 2. Objective 5 includes pupil 53, defining an imaging numerical aperture (imaging NA) 54. Also indicated is illumination NA 36.

For the following discussion, we introduce Cartesian coordinates, coordinate z along the optical axis 51, and coordinate x perpendicular thereto.

In any plane perpendicular to the optical axis 51, the intensity I of an image of the grating projected onto the plane can be expressed as $$I(x, z) = I_0\left[1 + C(z)\cos\left(\frac{2\pi}{\Lambda}x + \phi\right)\right]$$

Here C(z) specifies the amplitude of intensity modulation as a function of z, $\Lambda$ is the grating pitch, i.e., the distance between two neighboring lines of the grating 33, and $\phi$ is a phase offset. In order to measure the contrast and to ultimately determine the maxima of modulation portions like 273 and 274 shown in FIG. 4b, the fringe pattern is shifted in x-direction, which in the method according to the invention is accomplished by the oblique angle of the relative movement between the object and the objective, see also arrow 35 in FIG. 3. A number M of such fringe pattern shifts are made over the distance of one grating pitch, or put differently, M images are recorded while the pattern is shifted by one grating pitch due to the relative movement. The corresponding intensity values for example are $$I_m = I_0\left[1 + C\cos\left(\frac{2\pi}{\Lambda}x - 2\pi\frac{m}{M} + \phi\right)\right]$$

where m is counting the fringe pattern shifts, $1 \le m \le M$. The minimum value of M is 3, but preferably M is 4 or even higher. The fringe contrast can be evaluated from the "M-bucket" algorithm, described by the following calculation steps:

$$I_0 = \frac{1}{M}\sum_{m=1}^{M} I_m$$

$$A = \frac{2}{M}\sum_{m=1}^{M} I_m \sin\left(2\pi\frac{m-1}{M}\right)$$

$$B = \frac{2}{M}\sum_{m=1}^{M} I_m \cos\left(2\pi\frac{m-1}{M}\right)$$

$$C = \frac{\sqrt{A^2 + B^2}}{I_0}$$

If, for instance, a one-dimensional sinusoidal grating is used, the contrast of the projected image of the grating as a function of z changes approximately as $$C \approx C_0 \operatorname{sinc}\left(\frac{2\pi NA_i}{\Lambda}z\right), \text{ for } \Lambda > \frac{2\lambda}{NA}$$

where $NA_i$ is the numerical aperture 36 of the illumination, NA is the imaging numerical aperture 54, $\lambda$ is the wavelength (or mean wavelength) of the light used for illumination, and $C_0$ is the maximum fringe contrast at best focus.

Error propagation theory yields the following expression for the variance of the fringe contrast $$V(C) = \left[\frac{\partial C}{\partial A}\right]^2 V(A) + \left[\frac{\partial C}{\partial B}\right]^2 V(B) + 2\left[\frac{\partial C}{\partial A}\right]\left[\frac{\partial C}{\partial B}\right]\operatorname{COV}(A, B)$$

which can be shown to give $$\sigma_C \approx \frac{\sqrt{2}}{\sqrt{M}}\frac{\langle\sigma_I\rangle}{I_0}$$

Here $\langle\sigma_I\rangle$ is the average noise of pixel intensity, and $\langle\sigma_I\rangle/I_0$ is the inverse of detector dynamic range in the sensor noise limited case, and the inverse of the square root of the full well capacity of the sensor in the shot noise limited case.

The slope of focus response at 64% of the peak can be used to estimate measurement repeatability, giving $$\sigma_z \approx \frac{\Lambda\pi}{\sqrt{N}\,8NA_i C_0}\sigma_C$$

where N is the number of z-steps in the depth of focus. The measurement repeatability can then be expressed as $$\sigma_z \approx \frac{\sqrt{2}\,\Lambda\pi}{\sqrt{N_t}\,8NA_i C_0}\frac{\langle\sigma_I\rangle}{I_0}$$

with $N_t=MN$ indicating the total number of measurements, resulting from M fringe shifts at each of N z-steps, where a z-step is the change of position along the optical axis 51 while the projected pattern moves by one grating pitch, due to the relative movement between object and objective.

Figure 6:
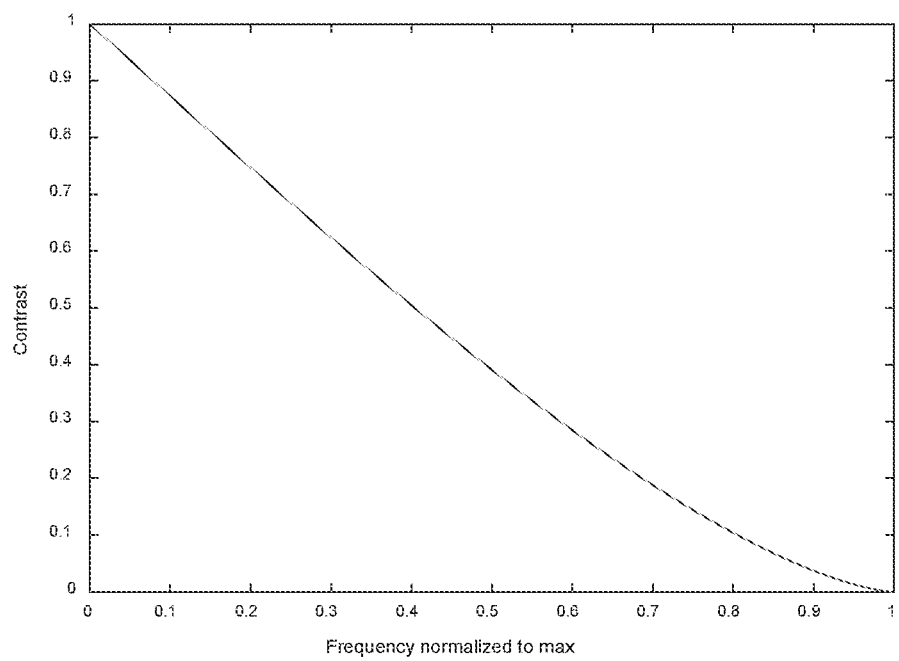
FIG. 6 shows contrast as a function of spatial frequency of a grating.

The goal of developing this error propagation model is to show how optics parameters affect performance at a fundamental level, so it is derived under ideal conditions in which mechanical motion error and sensor noise are ignored. This model represents the best case scenario. The preceding equation for the measurement repeatability shows that the measurement repeatability can be improved by:
1. Smaller grating pitch ($\Lambda$)
2. Higher fringe contrast ($C_0$)
3. Higher illumination numerical aperture ($NA_i$), which is limited by optics
4. Higher inverse of image dynamic range, which is limited by the sensor
5. Higher number of measurements, limited by data rate and throughput Therefore smaller grating pitch and higher grating contrast are preferred. However, grating pitch and fringe contrast are generally two conflicting requirements because fringe contrast decreases with smaller grating pitch, as shown in FIG. 6 for the optical transfer function of an incoherent imaging system with a circular aperture. In FIG. 6 the grating pitch is shown as spatial frequency of the grating, normalized to the maximum spatial frequency used. High spatial frequency means many grating lines per unit length, and thus a small distance between neighboring lines of the grating, i.e. a small grating pitch.

For incoherent illumination, the fringe contrast as a function of grating pitch is given by:

$$C(v) = \frac{2}{\pi}[\cos^{-1}v - v\sqrt{1-v^2}\,]$$

$$v = \frac{\Lambda_{min}}{\Lambda}$$

$$\Lambda_{min} = \frac{\lambda}{2NA}$$

Figure 7:
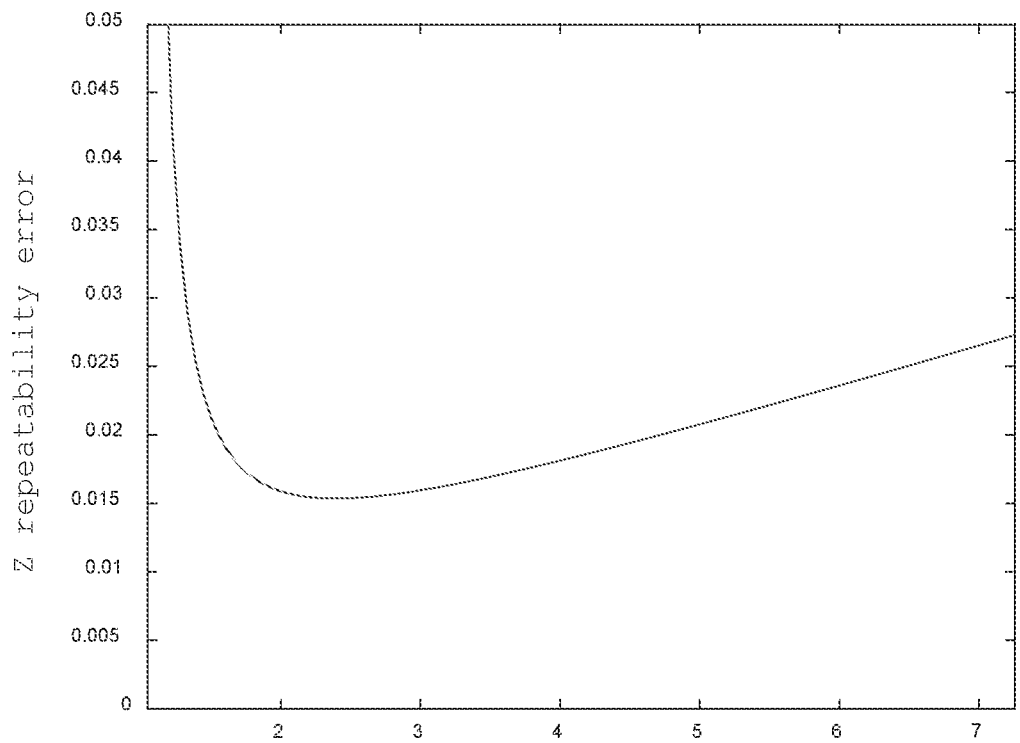
FIG. 7 shows repeatability as a function of grating pitch.

The measurement repeatability error as a function of grating pitch is obtained by combining these equations and the preceding equation for $\sigma_z$; the result is plotted in FIG. 7.

The optimum grating pitch is a little above twice the cut-off pitch $\Lambda_{min}$, for simplicity, it is written as:

$$\Lambda_{opt} \approx 2\Lambda_{min} = \frac{\lambda}{NA}$$

Therefore, for full NA illumination and shot noise limited case, the measurement repeatability is given by:

$$\sigma_z \approx \frac{\sqrt{2}\,\Lambda\pi}{\sqrt{N_t}\,8NA0.4}\frac{\langle\sigma_I\rangle}{I_0}$$

And in case of shot noise limited case:

$$\sigma_z \approx 1.4\frac{1}{\sqrt{N_t}}\frac{1}{\sqrt{N_e}}\frac{\lambda}{NA^2}$$

Here $N_e$ indicates the full well capacity of the imaging sensor. This is the best scenario case, to show the basic limit of the measurement performance. Real measurement is often limited by mechanical noise, mainly from the z-positioning stability.

As can be seen from FIG. 6, the projected grating contrast at the optimum grating pitch (at half of cut-off frequency) is about 40%, given by the modulation transfer function (MTF) of an incoherent imaging system. The low contrast is a result of the unbalanced mixing of diffraction orders at the object plane on which the grating is projected. This is further illustrated in FIGS. 8 and 9.

Figure 8:
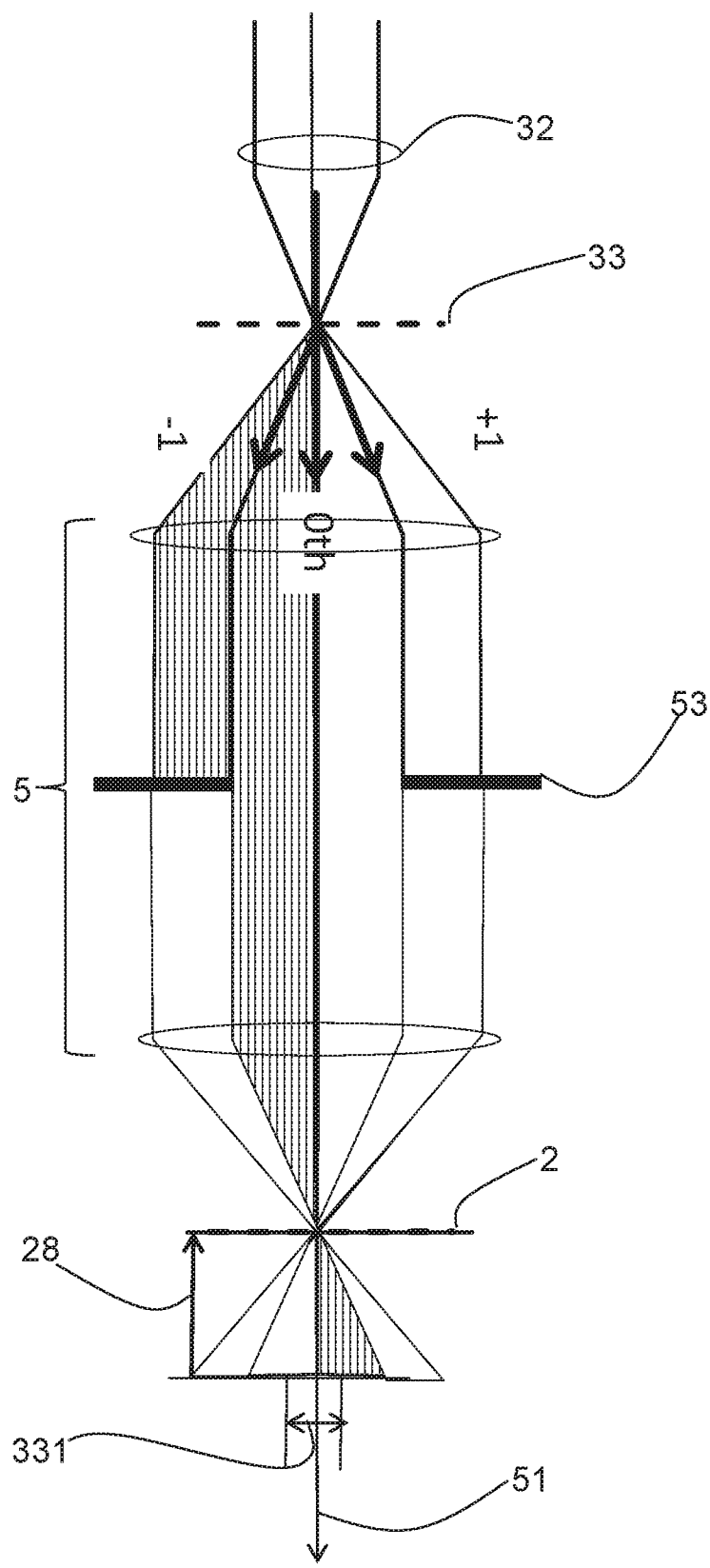
FIG. 8 shows an optical setup in conjunction with diffraction orders.

FIG. 8 shows condenser 32, grating 33, objective 5 with optical axis 51 and pupil 53, and object 2. Also indicated are the depth of focus 28 and the grating pitch 331, as appears projected on the object 2. The indications 0th, +1, and −1 refer to the $0^{th}$ diffraction order, as well as to the two first order diffractions. The grating here is assumed to have a pitch equal to the wavelength of the light used for illumination divided by the numerical aperture of the pupil 53.

Figure 9:
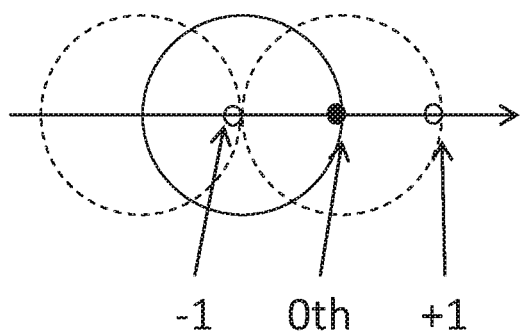
FIG. 9 shows position of diffraction orders relative to imaging pupil for setup of FIG. 8.

FIG. 9 shows that, for the setup of FIG. 8, for any given point on the illumination pupil, only one of the two first order diffractions (i.e. either +1 or −1) passes through the optics, while the other is diffracted to outside of the pupil. The image of the grating 33 on the surface of the object 2 thus is formed either from diffraction orders 0 and +1, or from diffraction orders 0 and −1, which regenerate the image of the grating by interference. As the intensities of light in one of the first orders is lower than the intensity of light in the $0^{th}$ order for a standard grating, the resulting image of the grating has a low contrast.

Figure 10:
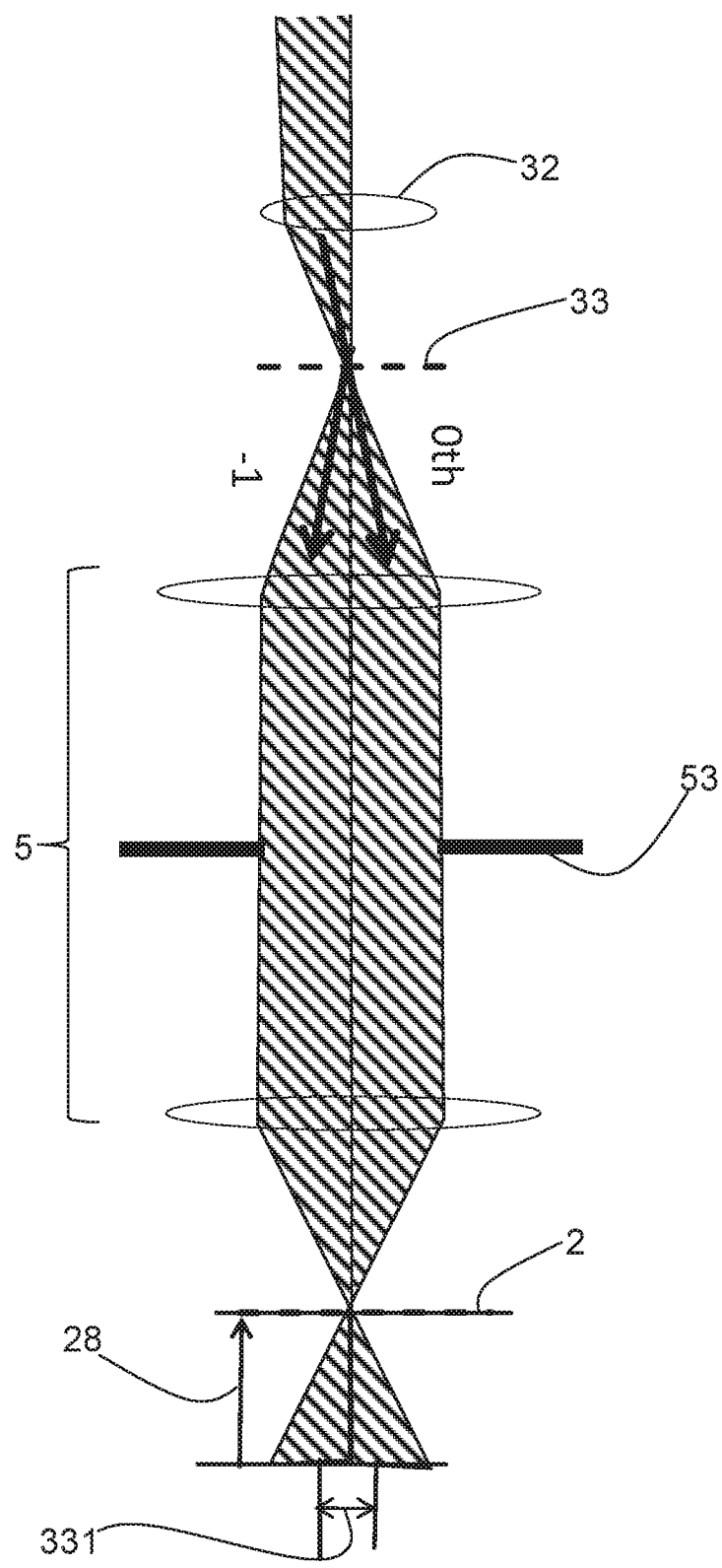
FIG. 10 shows an optical setup in conjunction with diffraction orders.

FIG. 10 shows how to improve contrast. Shown are condenser 32, grating 33, objective 5 with pupil 53, and object 2. Also indicated are the depth of focus 28, and the grating pitch 331, as appears on the object 2. The grating 33 here is assumed to have a pitch equal to the wavelength of the light used for illumination divided by the numerical aperture of the pupil 53. The grating 33 here is such that it produces diffraction order 0 and only one first order diffraction, here −1, wherein the $0^{th}$ diffraction order and the single first order diffraction have equal intensity. This can for example be achieved with a blazed grating.

Figure 11:
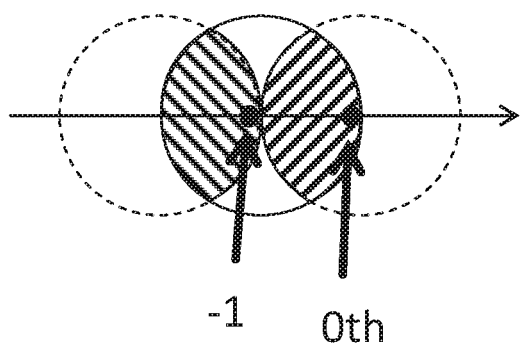
FIG. 11 shows position of diffraction orders relative to imaging pupil for setup of FIG. 10.

FIG. 11 shows that with the setup of FIG. 10, the image of the grating is formed by interference of the $0^{th}$ diffraction order and, in the case shown, the diffraction order −1. As these two diffraction orders have equal intensity in the setup of FIG. 10, the resulting image of the grating has an improved contrast in comparison with the situation shown in FIG. 9. Contrast can in fact be improved to 100%, leading to a corresponding improvement of measurement precision by more than a factor of 2. Several variations of the setup of FIG. 10 are possible, for example an off-axis aperture.

Note that the improved contrast is not obtained at the expense of extended depth of focus. As shown in FIGS. 8 and 10, the geometric depth of focus, defined as distance in from position of best focus at which the grating contrast has degraded to half maximum, both in the case of incoherent illumination, as in FIG. 8, and for partially coherent off-axis illumination, shown in FIG. 10, is roughly $\lambda/NA$. For example, for nearly coherent illumination, where the numerical aperture for illumination, $NA_i$, is much smaller than the imaging numerical aperture NA, the fringe pitch can be at minimum (corresponding to maximum spatial frequency) of $\lambda/(2NA)$ and still have a fringe contrast of 100%. A system where the contrast of the projected grating remains at 100% through a practically infinitely large range of focus would have no height sensitivity on a specular reflective surface.

Figure 12:
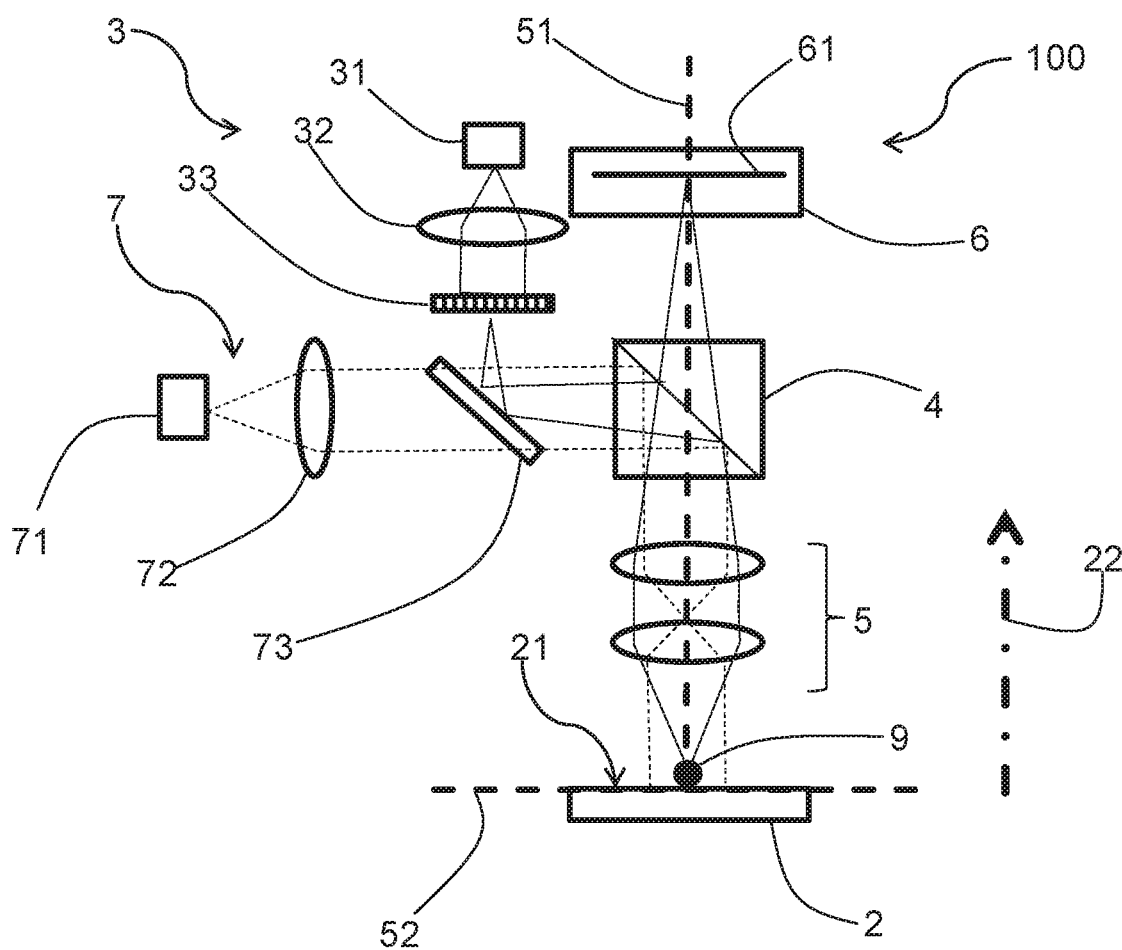
FIG. 12 shows an embodiment of a system for 3D topography measurements of a surface of an object.

FIG. 12 shows an embodiment of a system 100 for 3D topography measurements of a surface 21 of an object 2. The system 100 has a source of patterned illumination 3; in the embodiment shown, the source of patterned illumination 3 has a light source 31, for example one or plural LEDs, condenser optics 32, and a pattern mask 33. The system 100 also has a source of uniform illumination 7; in the embodiment shown, the source of uniform illumination 7 has a light source 71, for example one or plural LEDs, and condenser optics 72. A means 73, for example a beam splitter like a semi-transparent mirror, is provided for directing both light from the source of uniform illumination 7 and from the source of patterned illumination 3 to beam splitter 4. Beam splitter 4 directs at least a portion of the light towards objective 5, through which the light reaches surface 21 of object 2. Light from the surface 21 then passes through the objective 5 and reaches beam splitter 4, which directs a portion of the light from the surface 21 to a detector 61, which, as is shown here, may be part of a camera 6. The objective 5 defines an optical axis 51, and a focal plane 52; the optical axis 51 is perpendicular to the focal plane 52. On the surface 21 of the object 2 a structure is shown, which in particular can be a specular structure, and here specifically is a solder bump 9.

By operating the light sources 31 and 71 alternatingly, an alternating illumination of the surface 21 of the object 2 is provided. If the light source 71 is operated, i.e. caused to emit light, the illumination of the surface 21 of the object 2 is uniform. If the light source 31 is operated, i.e., caused to emit light, the illumination of the surface 21 of the object 2 is patterned.

Via the detector 61 a plurality of images of the surface 21 are recorded, while a relative movement is performed between the object 2 and the objective 5. Some of the images of the plurality of images are recorded while the surface 21 is subject to uniform illumination, and some of the images of the plurality of images are recorded while the surface 21 is subject to patterned illumination. A direction 22 of the relative movement between the object 2 and the objective 5 in this embodiment is parallel to the optical axis 51. During the relative movement, the surface 21 of the object 2 passes through the focal plane 52 of the objective 5. In this macroscopic view of the system 100, the focal plane 52 is shown coincident with the surface 21 of the object 2.

As in the embodiment shown the direction of relative movement 22 is parallel to the optical axis 51 of the objective 5, in contrast to the embodiment of FIG. 1 there is no shift of the projected pattern relative to the surface 21 of the object 2. The embodiment of FIG. 12 is particularly aimed at inspecting surfaces with solder bumps. Solder bumps are typically laid out in arrays on the surface 21, only one representative solder bump 9 is shown in FIG. 12. In areas between solder bumps, where the distance between solder bumps is larger than the pitch of the pattern, e.g. grating, projected onto the surface, the height of the surface between the solder bumps can be measured from the contrast of the projected pattern without requiring a shift of the pattern relative to the surface. This implies that there is no need to record plural images for each relative position between object 2 and objective 5 along the optical axis 51, as is necessary in prior art.

In this embodiment, the surface height between the solder bumps 9 is determined from images recorded under patterned illumination, while the height of the solder bumps 9 is determined from images recorded under uniform illumination.

We remark that, while in the embodiment shown in FIG. 12, the source of patterned illumination 3 and the source of uniform illumination 7 have a light source each, this is not a limitation of the invention. Embodiments are conceivable in which the source for patterned illumination 3 and the source for uniform illumination 7 use a common light source. In such a case suitable means are provided for achieving the alternating illumination of the surface of the object by patterned and uniform illumination. Such means may for example be filters of switchable transmission, so that a path of light from the light source to the further elements of the source for patterned illumination and the source for uniform illumination, respectively, can be alternatingly blocked. The intensity of light from the respective sources of illumination may also be controlled by controlling the transmission of the respective filters. Alternatively, the means may also be such that they collect light from the light source and direct it alternatingly to the further elements of the source for patterned illumination and the source for uniform illumination, respectively.

Figure 13:
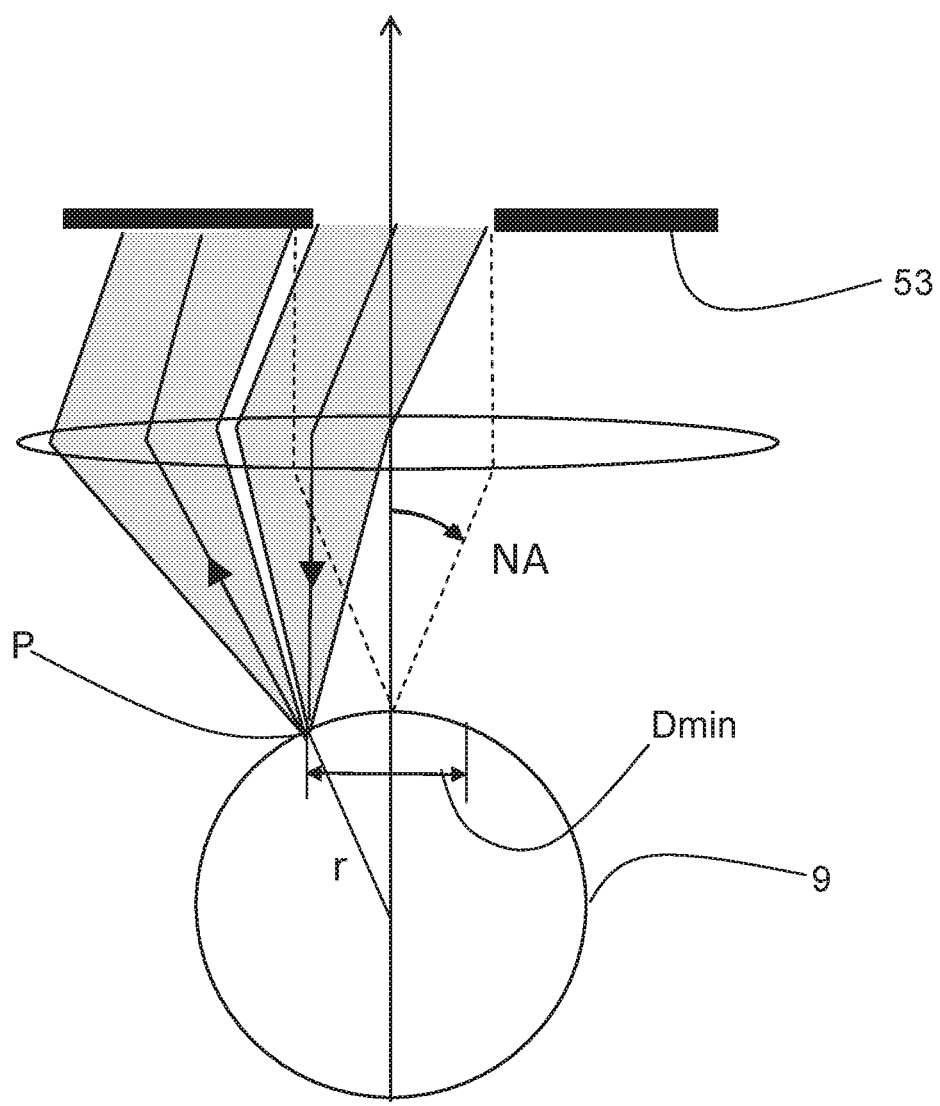
FIG. 13 illustrates an optical situation when imaging a solder bump.

FIG. 13 illustrates an optical situation when imaging a solder bump 9, here of radius r. It turns out that, due to the surface curvature of the reflective solder bump 9, only a small portion of the bump top can be imaged. The size of the bump top visible to the detector depends on both illumination numerical aperture and imaging numerical aperture. At full numerical aperture (NA) illumination, the full-width-half-maximum radius of the bump top visible to the detector is given by D=rNA. The optical NA needs to be large enough to provide enough optical resolution so that individual bumps in an array layout can be measured accurately. The bump layout is typically 1:1 ratio of bump spacing to bump diameter, therefore the imaging point spread function (PSF) needs to be on the order of the bump radius to avoid optical cross-talk between adjacent bumps. The minimum NA is therefore:

$$\frac{\lambda}{NA_{min}} < r$$

And the corresponding minimum diameter of a visible bump top then is $$D_{min} \approx \lambda$$

For device topography inspection, the typical NA is around NA=0.1-0.3 in order to have a large field size to image the whole device and also to achieve high throughput, so the visible bump top is smaller than the optical PSF, therefore can be treated as a point object of the imaging system. In this case, either the peak pixel intensity or the size of the image of the bump top itself can be used for height measurement, since it follows closely how the imaging point spread function changes with focus.

FIG. 13 shows that, while a point P of the surface of the bump 9 may still be subject to illumination through pupil 53, light reflected from this point P does not pass through the pupil 53, and thus does not reach the detector 61 (see FIG. 12). The point P of the surface of the solder bump 9 therefore is not visible in an image recorded by the detector 61. It should be appreciated from FIG. 13 that this failure of the reflected light to pass through the pupil 53 is mainly due to the specular nature of the reflection combined with the curvature of the surface of the bump 9.

Figure 14:
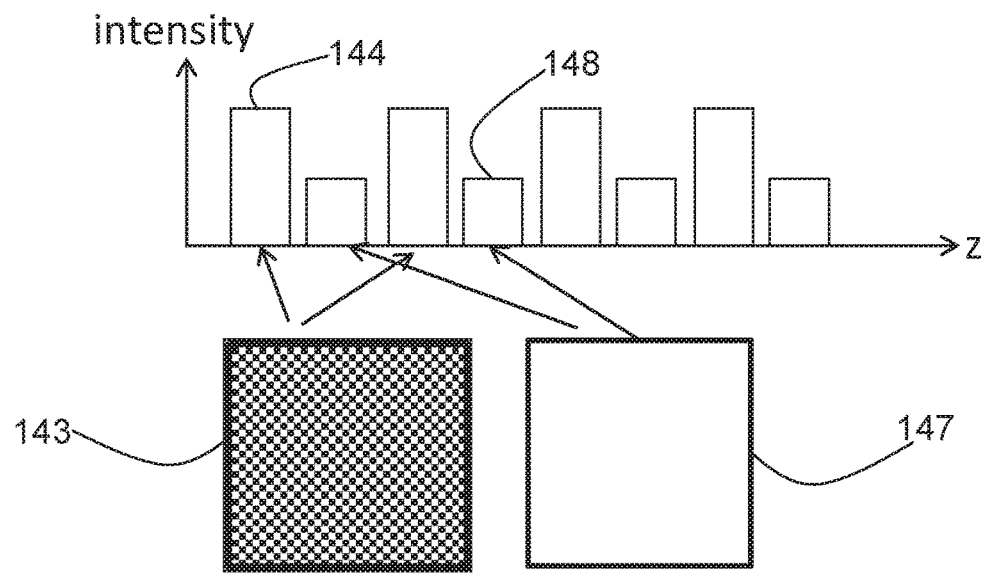
FIG. 14 shows an operation sequence of the embodiment of a system for 3D topography measurements of a surface of an object shown in FIG. 12.

FIG. 14 shows an operation sequence of the system shown in FIG. 12, which illustrates the alternating illumination generated by the source of patterned illumination 3 and the source of uniform illumination 7 in FIG. 12. The abscissa of the diagram shows a position z, which is the position of the object 2 along the optical axis 51 of the objective 5 (see FIG. 12) during movement along direction 22. The ordinate shows the intensity of the light emitted by the light sources 31 and 71, respectively. A square 143 with a checkerboard pattern symbolizes the operation of the source for patterned illumination 3 (without the pattern being limited to checkerboard), and an empty square 147 symbolizes the operation of the source for uniform illumination 7. Arrows pointing from the squares to bars 144, 148 in the diagram indicate the stages of movement along the optical axis during which the respective source of illumination is active. So the source of patterned illumination 3 is active, i.e. provides illumination, for stages of the movement along the optical axis 51 where bars 144 are shown in the diagram, and the source of uniform illumination 7 is active, i.e. provides illumination, for stages of the movement along the optical axis 51 where bars 148 are shown in the diagram.

The bars 144 indicate a higher intensity of the light source 31 in the source of patterned illumination 3 than the bars 148, which give the intensity of the light source 71 in the source of uniform illumination 7. This is to show that the intensities of the light sources can be adapted to the properties of the portions of the surface 21 on which measurements are respectively performed. For measurements on the specular solder bumps, a lower intensity is normally adequate than for measurements on the surface between the solder bumps.

Figure 15:
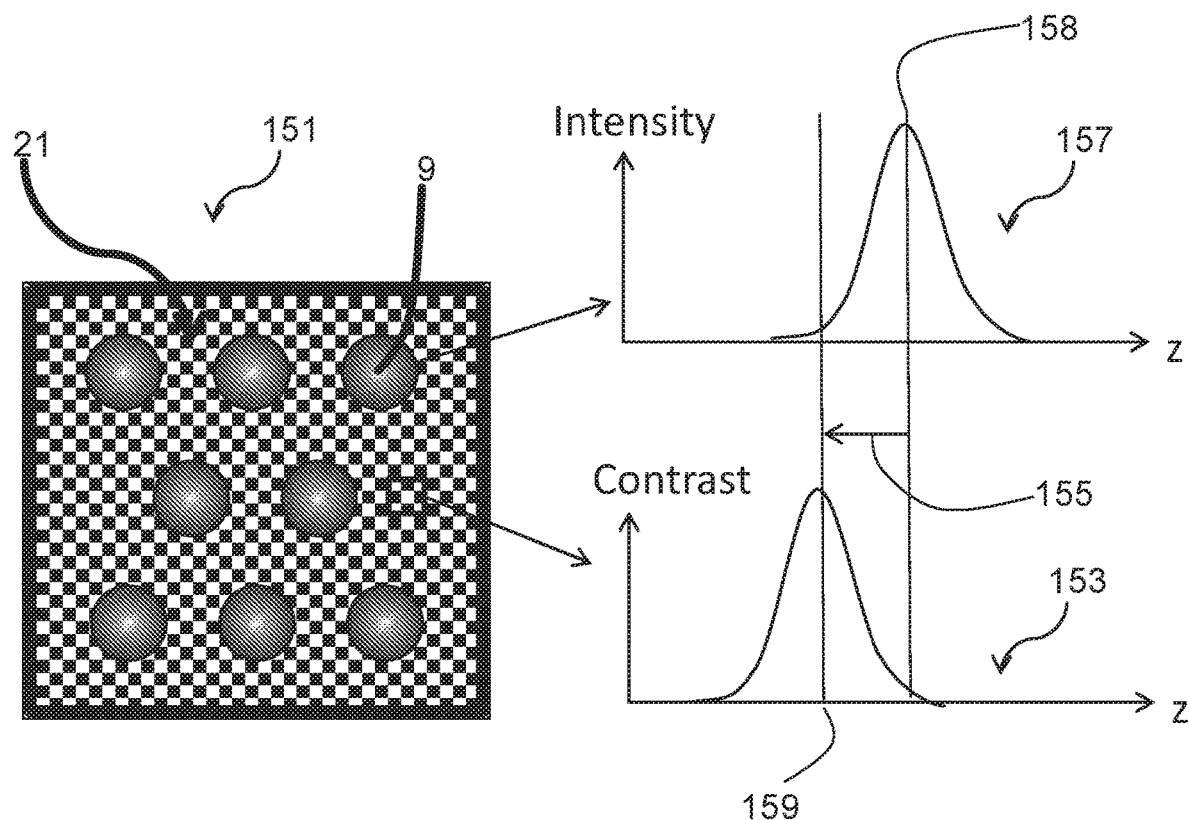
FIG. 15 shows how height measurements are obtained from the operation sequence shown in FIG. 14.

FIG. 15 shows, for the purpose of illustration only, a combined image 151 of solder bumps under uniform illumination and the surface 21 between the solder bumps under patterned illumination. Two diagrams are also shown. Diagram 157 gives, as a function of z-position, i.e., position along direction 22 (see FIG. 12) parallel to optical axis 51, the intensity recorded from a solder bump 9. Diagram 153 gives, as a function of z-position, the contrast measured from the surface 21 between the solder bumps 9. The intensity shown in diagram 157 has a maximum at a z-position 158, the contrast shown in diagram 153 has a maximum at a z-position 159. These z-positions 158, 159, where the respective maximum occurs, are the z-positions at which the top of the solder bump 9 (maximum 158) and the surface 21 (maximum 159), respectively, pass through the focal plane 52 (see FIG. 12). The difference 155 between these z-positions 158 and 159 therefore is the height of the solder bump 9.

As for the determination of the contrast values that enter diagram 153, these can be calculated from a minimum of 2×2 pixels, if the projected pattern is a checkerboard pattern matched to pixel size of detector 61 (see FIG. 12). A larger pixel area, i.e. an N×N pixel area with N>2, can also be used. The choice will usually depend on distance between bumps 9 and spatial resolution requirements perpendicular to the optical axis 51. Larger pixel areas lead to a higher precision of the calculated contrast, but, evidently, to lower spatial resolution perpendicular to the optical axis 51.

Figure 16:
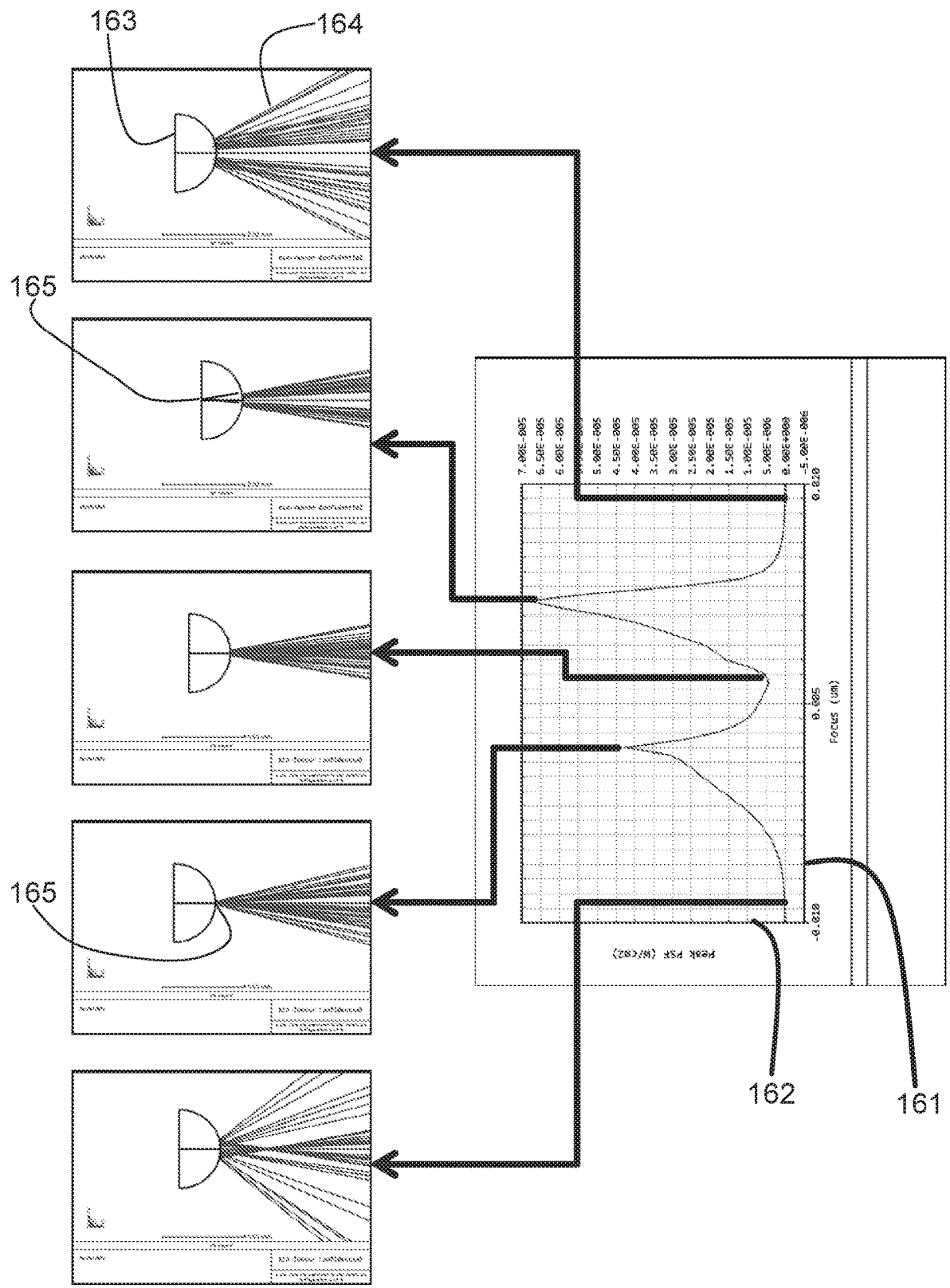
FIG. 16 shows a relation between pixel intensity and position of illumination focus point relative to object for a surface of small curvature.

FIG. 16 shows the pixel response (e.g. value of a pixel representing light intensity recorded by the corresponding pixel of the detector) in the method according to the invention for a surface of small curvature, like a solder bump. To the left of the figure, five images show light rays 164, directed to a focus point 165 (only indicated in two of the images), impinging on the surface of a hemisphere 163 (solder bump), for different relative positions between the hemisphere 163 and the focus point 165. The diagram to the right gives the pixel response on the ordinate 162, while the abscissa 161 gives the relative position between the hemisphere 163 and the focus point 165. The arrows indicate which parts of the pixel response in the diagram correspond to which of the five images on the left.

As can be seen, the pixel response has two maxima. The maximum having the smaller value of the abscissa 161 corresponds to the situation where the focus point 165 of the light rays 164 is at the top of the hemisphere 163, as shown in the second image from below on the left. In a measurement, this situation occurs when the top of the solder ball is in the focal plane 52 of the objective 5 (see FIG. 12). The second maximum occurs when the focus point 165 of the light rays 164 coincides with the center of the hemisphere 163, as shown in the second image from above on the left; note that the light rays 164 do not actually penetrate into the hemisphere 163, but get reflected on its surface. When performing a measurement, the direction of the relative movement between the object 2 and the objective 5 is known; therefore, it is unambiguously clear which of the two peaks corresponds to a top of a solder ball in the focal plane 52. The other peak can be used to measure the curvature of the bump top surface, which in turn can be used for calibration purposes to improve measurement accuracy.

Figure 17:
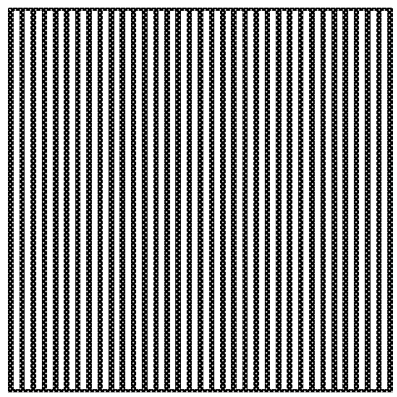
FIG. 17 shows several examples of pattern masks for generating the patterned illumination.
Figure 17:
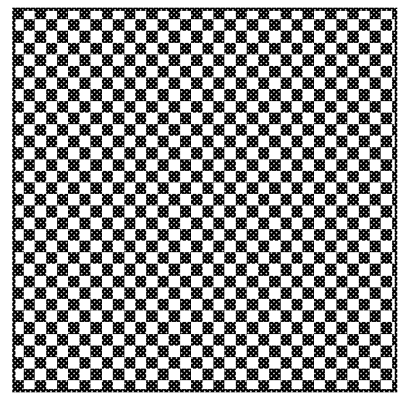
Figure 17:
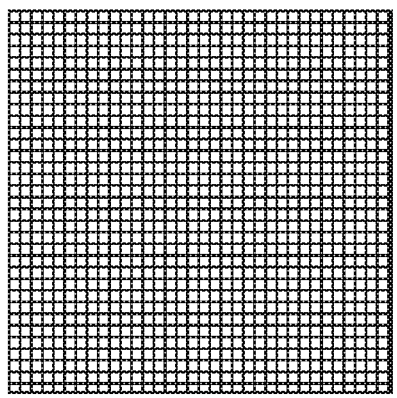
Figure 17:
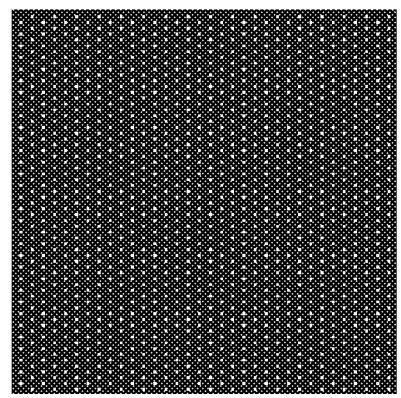

FIG. 17 shows several examples of pattern masks for generating the patterned illumination. These pattern masks can be used both in embodiments of the type shown in FIG. 1, with patterned illumination only, and in embodiments of the type shown in FIG. 12, with alternating patterned and uniform illumination. The invention is not limited to the types of pattern masks shown here. The specific examples shown are a sinusoidal grating (A), a checkerboard (B), a line grid or cross-line grating (C), and a pinhole array (D).

Figure 18:
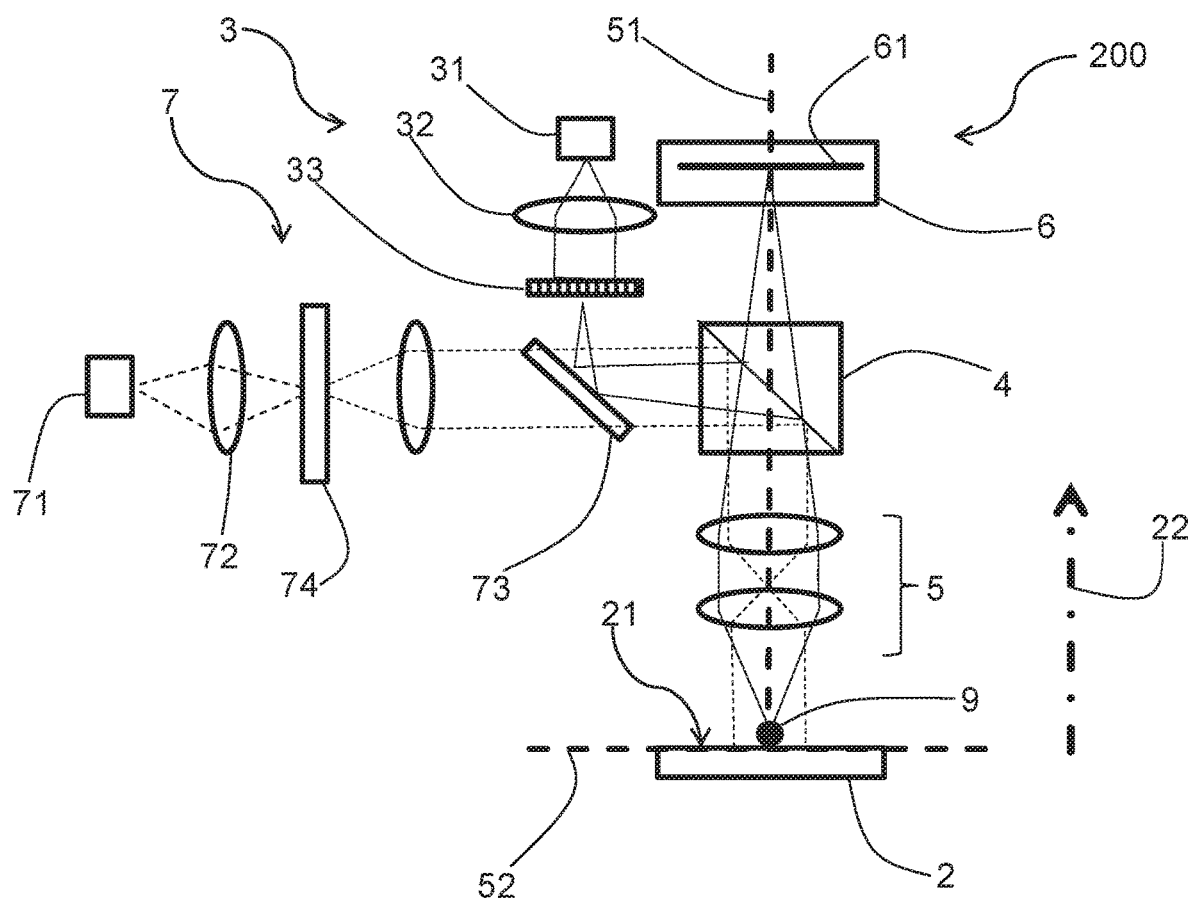
FIG. 18 shows an embodiment of a system for 3D topography measurements of a surface of an object.
Figure 18:
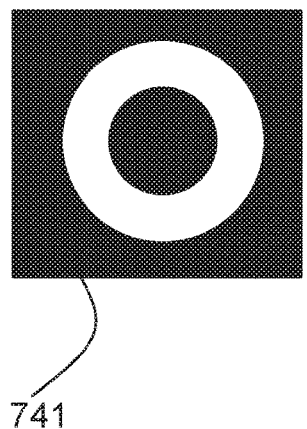
Figure 18:
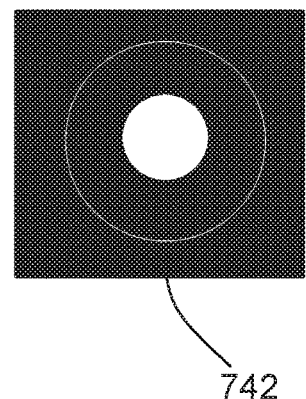

FIG. 18 shows an embodiment of a system 200 for 3D topography measurements of a surface 21 of an object 2. The embodiment shown is very similar to the embodiment of the system 100 shown in FIG. 12, where most of the elements that appear in FIG. 18 have already been discussed. In the system 200, a pupil mask 74 is included in the source of uniform illumination 7. The pupil mask 74 acts as an illumination aperture. An illumination aperture can improve image contrast and focus response of various feature shapes. Also shown in FIG. 18 are two, non-limiting, examples of possible shapes of pupil masks 74. Pupil mask example 741 is a ring aperture, pupil mask example 742 is a circular aperture.

Figure 19:
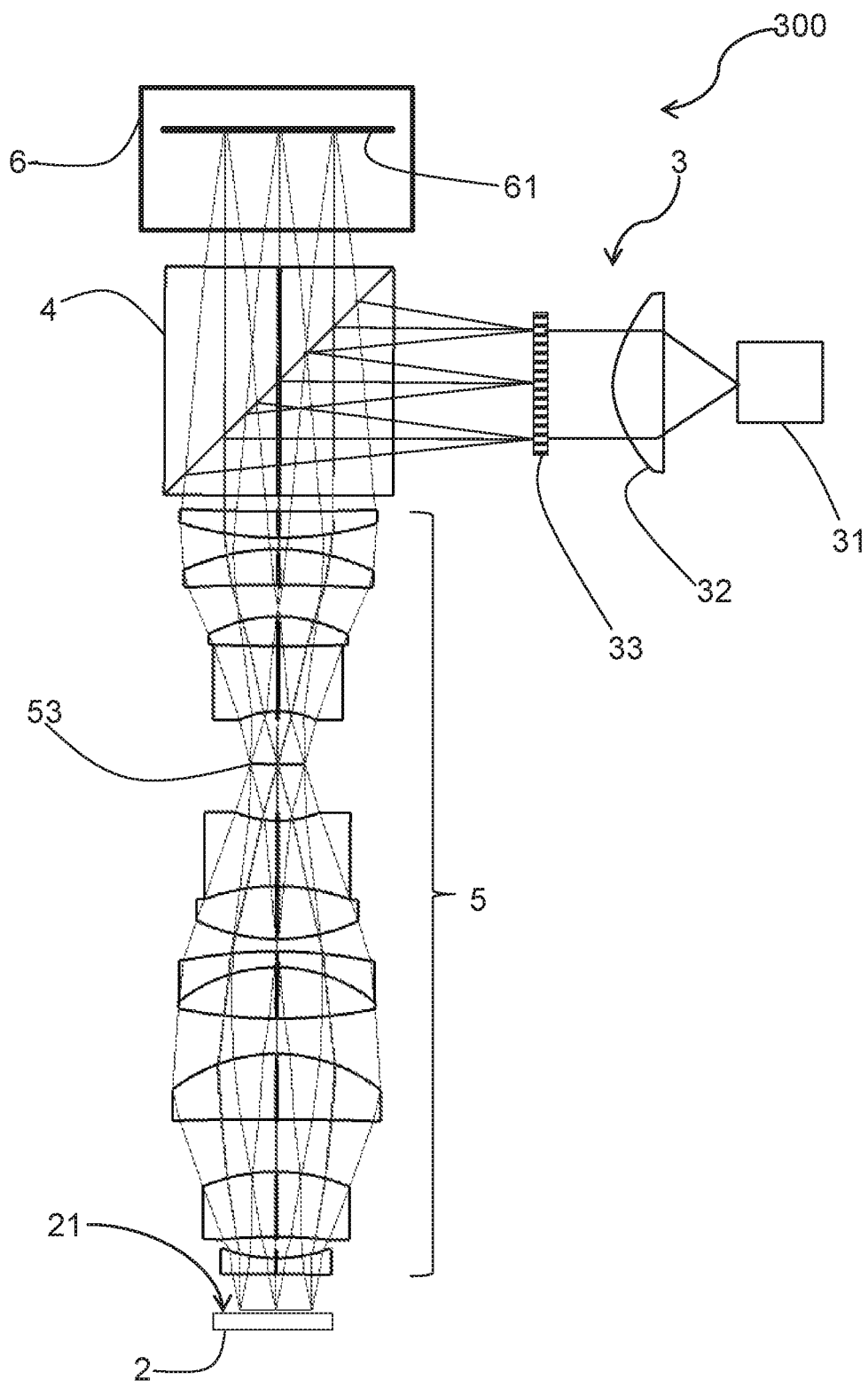
FIG. 19 shows an optics module for carrying out the method according to the invention.

FIG. 19 shows an optics module 300 that is an embodiment of a system according to the invention and thus can be used for carrying out the invention. The configuration of the optics module 300 shown here is similar to the configuration of the system 1, shown in FIG. 1; an optics module based on the configuration of system 100 of FIG. 12, or of system 200 of FIG. 18 may also be conceived of.

A source for patterned illumination 3 includes a light source 31, a condenser 32, and a pattern mask 33. From the source for patterned illumination 3 the light reaches beam splitter 4, which directs a portion of the light to objective 5, from where it reaches object 2 and provides a patterned illumination of the surface 21 of the object 2. The objective 5 includes a pupil 53. Light from the surface 21 passes through objective 5 and beam splitter 4, and then reaches detector 61 in camera 6. Detector 61 is used to record a plurality of images of the surface 21 during a relative movement of the object 2 and the objective 5, as has already been discussed above.

The module 300 is compact and simple, thus suitable for use in parallel inspection of plural objects. In order to provide a very specific, yet non-limiting example, the objective 5 may have a 22 mm field diameter, a NA of 0.2, and may be corrected for typically 30 nm wavelength bandwidth of LED illuminations; this is preferred, as one or plural LEDs are typically used as light source 31. The NA is large enough to achieve sub-µm measurement precision and the field size can cover most of the sizes of objects that are to be inspected. The beam splitter cube 4 in the imaging side splits the illumination path from the imaging path, and is an integrated part of the lens design. This is a much simpler and more compact design than the conventional imaging microscopes which have a separate objective lens and tube lens, and for which grating projection requires an additional tube lens since illumination and imaging path are split at the collimated space between objective and tube lens. Another advantage of this design is that pattern mask 33 and detector 61 are at exactly conjugate planes, therefore residual field distortion is cancelled and sampling aliasing of projected patterns is eliminated. The design is also telecentric on both object and image sides to minimize through focus signal distortion.

Figure 20:
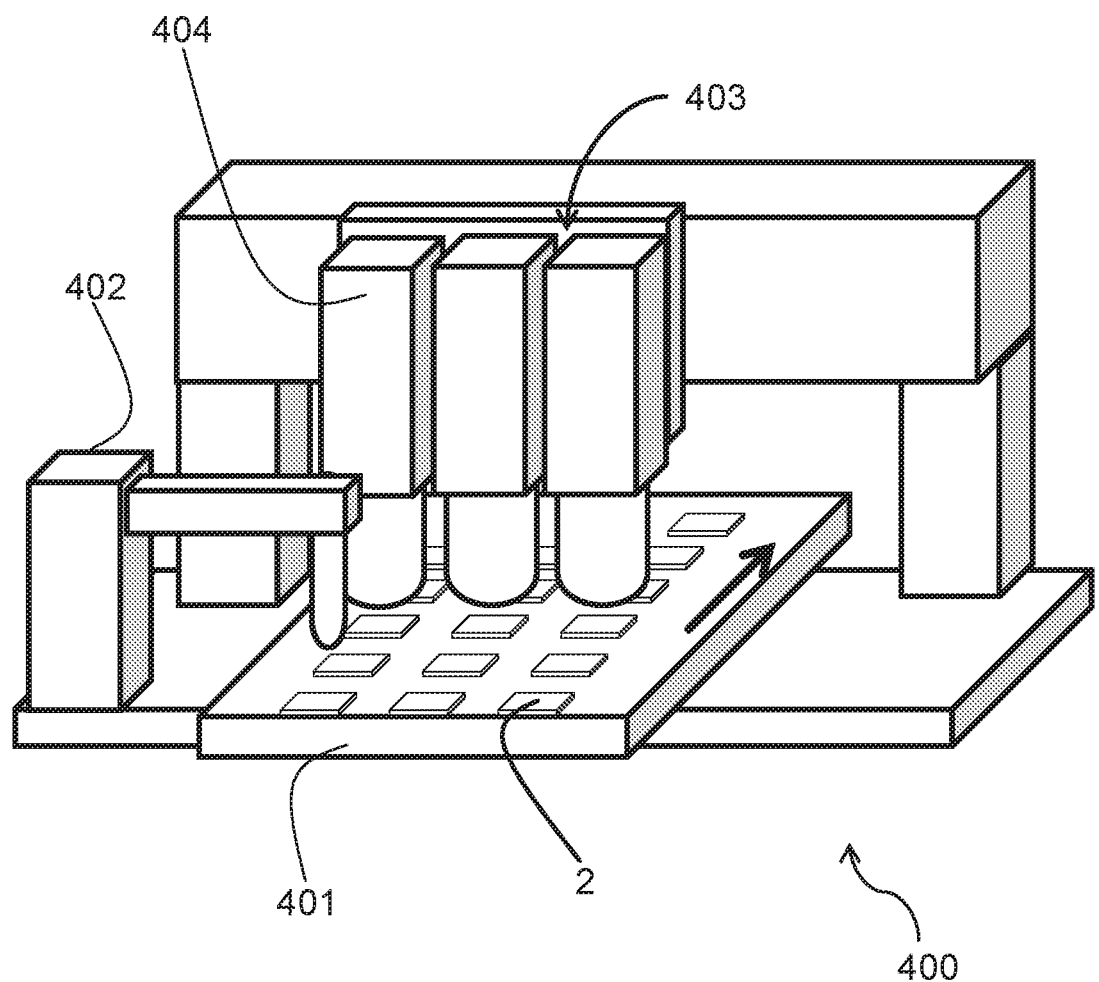
FIG. 20 shows a system for parallel inspection of plural objects.

FIG. 20 shows a system 400 for parallel inspection of plural objects 2. Objects 2 are placed on a conveyor 401 by pick-and-place device 402. The conveyor 401 carries the objects 2 to and past an arrangement 403 of inspection modules 404; in the specific example shown, the system 400 has three inspection modules 404. Each object 2 is inspected by one inspection module 404. Each inspection module 404 performs a method according to the invention on each object 2 it is used to inspect. It is also conceivable that the system 400 is configured such that the number of inspection modules 404 can be varied, i.e. that inspection modules 404 can be added to or removed from the system 400, depending on the number of objects 2 to inspect and on throughput requirements.

Each inspection module 404 may for example be a module 300 as described in FIG. 19, but may also be, for example, a system 1 as discussed in FIG. 1, a system 100 as discussed in FIG. 12, or a system 200 as discussed in FIG. 18. The inspection module 404 may in general be any of the systems according to the invention discussed in the context of FIGS. 1 to 19, as well as any system configured to carry out a method according to the invention. The inspection module 404 may use the method according to the invention based on a patterned illumination and a relative movement between the object and the objective at an oblique angle between the direction of the relative movement and the optical axis of the objective, or the method according to the invention employing a patterned illumination and a uniform illumination alternatingly.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

LIST OF REFERENCE SIGNS 1 system
2 object
21 surface of object
22 direction of relative movement
221 component of relative movement
23 oblique angle
24 elevation
25 height
251 height difference
27 step
271 portion of surface
272 portion of surface
273 portion of light intensity
274 portion of light intensity
26 reference plane
28 depth of focus
3 source of patterned illumination
31 light source
32 condenser
33 pattern mask
331 grating pitch
34 pattern
34 direction of movement of pattern relative to surface
36 illumination aperture
4 beam splitter
5 objective
51 optical axis
52 focal plane
53 pupil
54 imaging aperture
6 camera
61 detector
7 source of uniform illumination
71 light source 72 condenser
73 means (beam splitting)
74 pupil (illumination aperture)
741 ring aperture
742 circular aperture
81 abscissa
82 ordinate
9 solder ball
100 system
143 checkerboard square
144 bar
147 empty square
148 bar
151 combined image
153 diagram
155 height difference
157 diagram
158 maximum (intensity)
159 maximum (contrast)
161 abscissa
162 ordinate
163 hemisphere
164 light rays
165 focus point
200 system
300 module
400 system
401 conveyor
402 pick-and-place device
403 arrangement (of inspection modules)
404 inspection module
A, B, C, D pattern mask examples
Dmin minimum diameter of visible solder ball top
P point on solder ball surface

The invention claimed is:

1. A system for optical three-dimensional topography measurement of a surface of an object, the system comprising:
a source of patterned illumination;
an objective including an optical axis perpendicular to a macroscopic extension of the surface of the object, arranged to direct the patterned illumination to the surface of the object;
an optical detector arranged and configured for recording a plurality of images of the surface of the object through the objective during movement of the object relative to the objective that is in a direction along an oblique angle relative to the optical axis of the objective, wherein a position on the surface of the object is in one or more of the plurality of images; and
a computer connected to the optical detector that is configured to determine height information for the position on the surface of the object based on differences in light intensity of the plurality of images, wherein the light intensity changes along the direction.

2. The system of claim 1, wherein the source of patterned illumination includes a light source and a pattern mask.

3. The system of claim 2, wherein the pattern mask has a checkerboard pattern or a pinhole array.

4. The system of claim 2, wherein the pattern mask is a grating.

5. The system of claim 4, wherein the grating is an amplitude grating or a phase grating.

6. The system of claim 4, wherein the grating is a line grating or a sinusoidal grating or a cross-line grating.

7. The system of claim 4, wherein the grating is a blazed grating.

8. The system of claim 2, wherein the pattern mask and the detector are in conjugate planes.

9. The system of claim 1, wherein a beam splitter is arranged in such a way that both an illumination path between the source of patterned illumination and the objective, and an imaging path between the objective and the detector pass through the beam splitter.

10. The system of claim 9, wherein the objective is positioned to correct diffraction caused by the beam splitter.

* * * * *